(12) United States Patent
Fourie et al.

(10) Patent No.: US 10,173,373 B1
(45) Date of Patent: Jan. 8, 2019

(54) AUTOMATED BALLOON ASSEMBLY MACHINE

(71) Applicant: LOON LLC, Mountain View, CA (US)

(72) Inventors: Daniel Henry Fourie, Sunnyvale, CA (US); Matthew Knoll, Mountain View, CA (US)

(73) Assignee: LOON LLC, Mountain View, CA (US)

( * ) Notice: Subject to any disclaimer, the term of this patent is extended or adjusted under 35 U.S.C. 154(b) by 0 days.

(21) Appl. No.: 15/165,752

(22) Filed: May 26, 2016

(51) Int. Cl.
*B29C 65/00* (2006.01)
*B29C 65/30* (2006.01)
*B29L 22/02* (2006.01)

(52) U.S. Cl.
CPC ......... *B29C 66/4326* (2013.01); *B29C 65/30* (2013.01); *B29C 66/1122* (2013.01); *B29K 2023/06* (2013.01); *B29L 2022/022* (2013.01)

(58) Field of Classification Search
CPC . B29C 66/4326; B29C 66/1122; B29C 65/30; B29L 2022/022; B29K 2023/06
See application file for complete search history.

(56) References Cited

U.S. PATENT DOCUMENTS

| | | | |
|---|---|---|---|
| 2,635,671 A * | 4/1953 | La Mere | B64B 1/58 156/539 |
| 2,666,600 A | 1/1954 | Huch et al. | |
| 2,703,769 A | 3/1955 | Stinger et al. | |
| 3,063,889 A * | 11/1962 | Staff | B29C 66/435 156/201 |
| 4,877,205 A | 10/1989 | Rand | |
| 2011/0083784 A1* | 4/2011 | Henry | B29C 65/103 156/60 |

* cited by examiner

*Primary Examiner* — Michael N Orlando
*Assistant Examiner* — Cynthia L Schaller
(74) *Attorney, Agent, or Firm* — Lerner, David, Littenberg, Krumholz & Mentlik, LLP

(57) ABSTRACT

A system for manufacturing a balloon envelope includes a table component and a sealing component. The sealing component includes a first level and a second lower level. The first level further includes first and second platforms. The first platform can provide a work area for sealing respective first and second sheets of material together to form a sealed edge and the second platform may provide a work area for sealing the second sheet of material and a third sheet of material together. The first, second, and third sheets of material respectively form first, second, and third gores of the balloon envelope. The sealing component may be configured to move along length of the first platform and to apply a heat seal to bond the first sheet of material to the second sheet material and form a sealed edge.

20 Claims, 15 Drawing Sheets

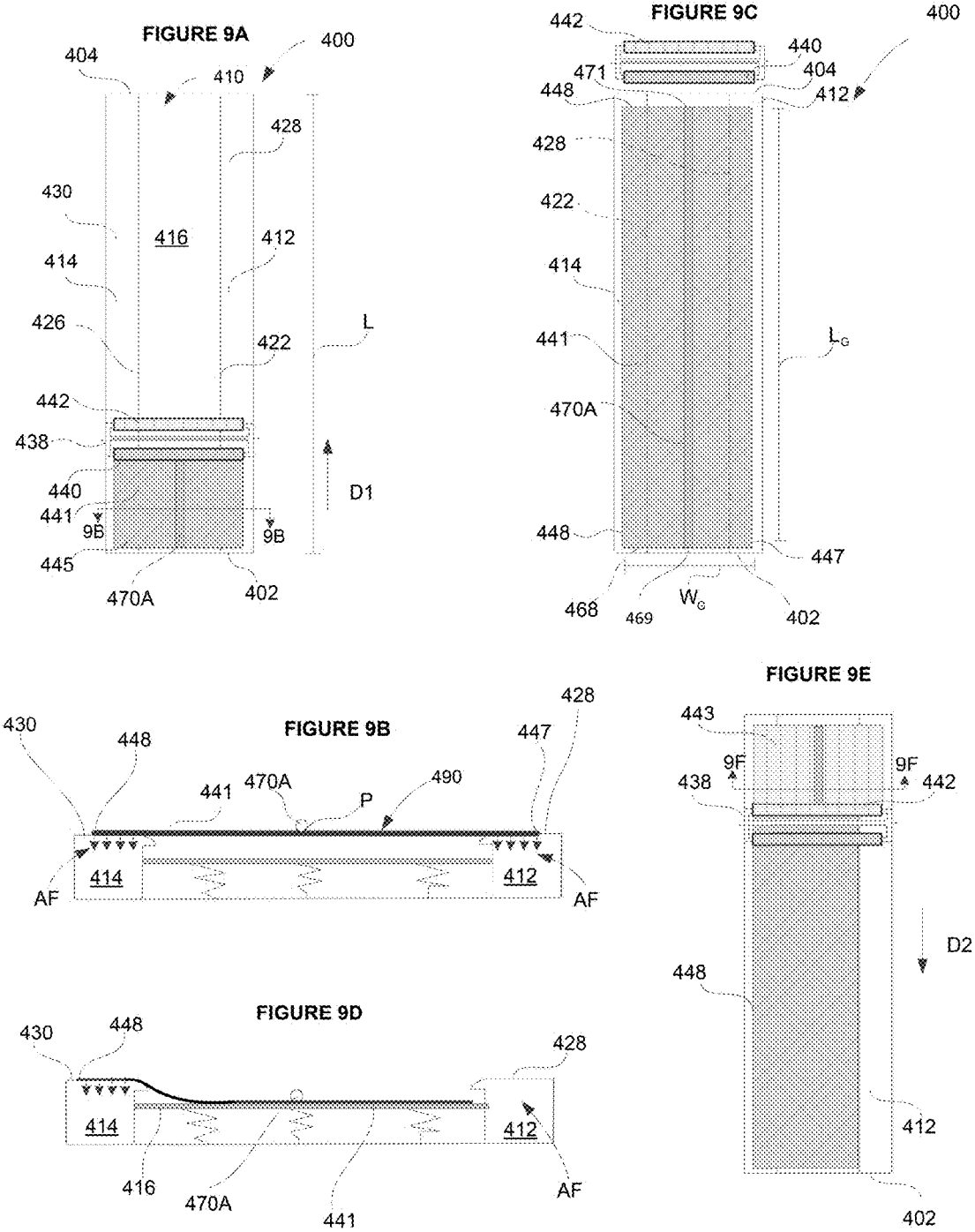

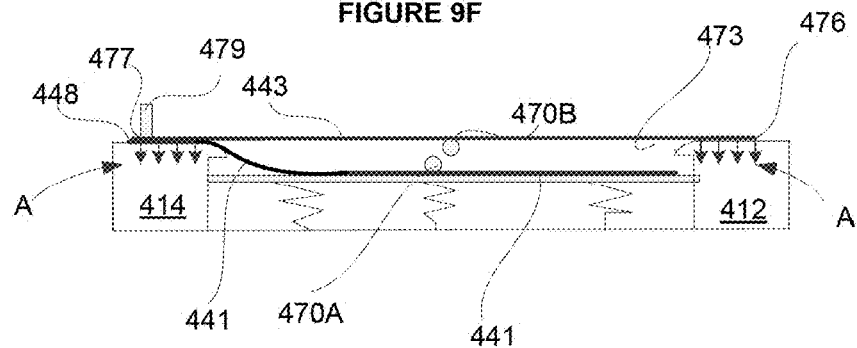
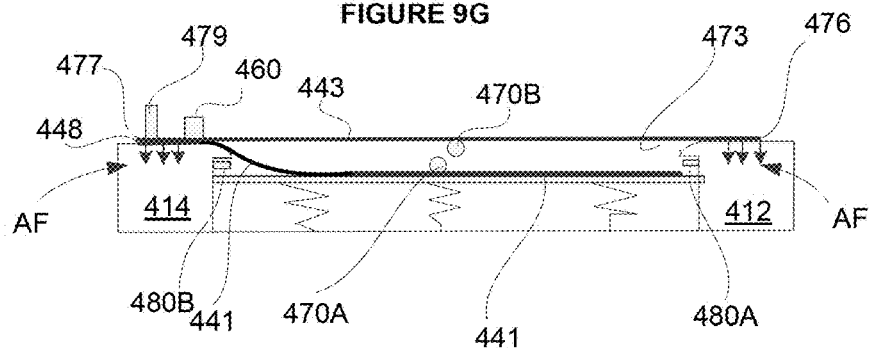
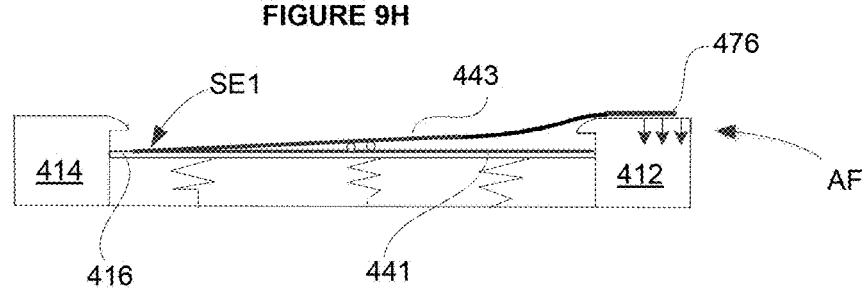
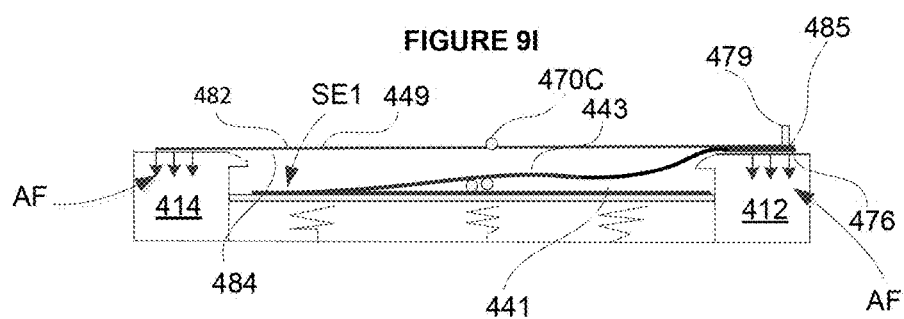

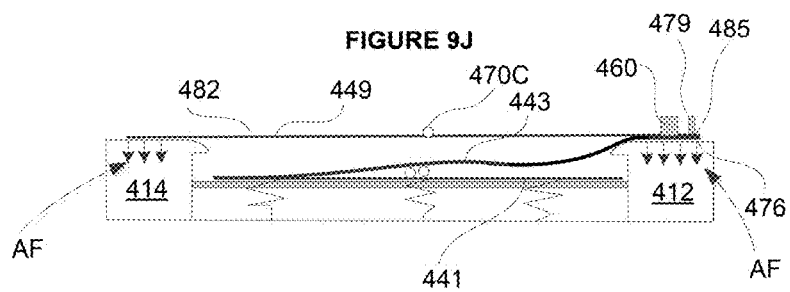
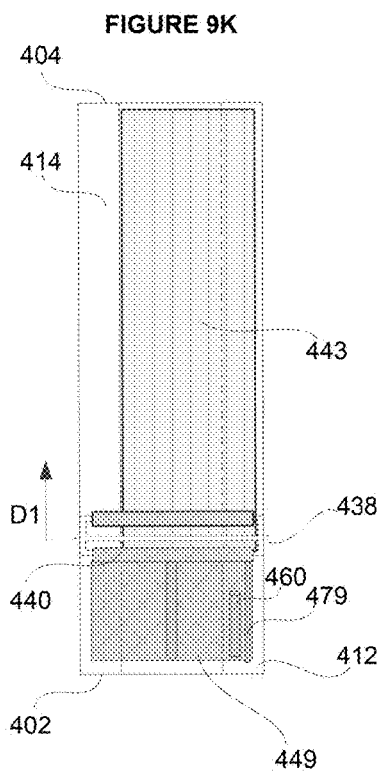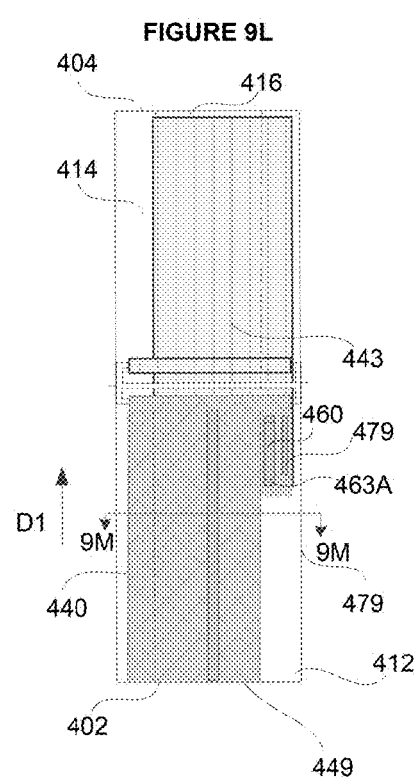
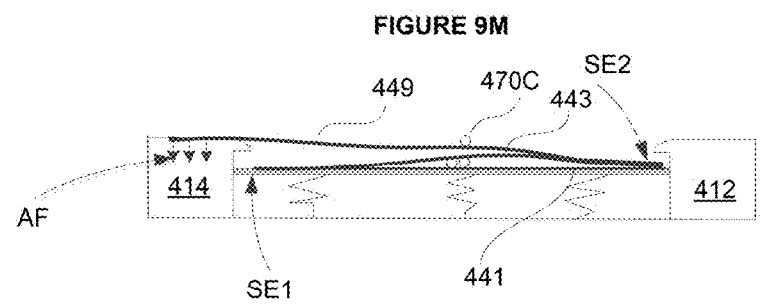

608 — pulling a first sheet of material in a first direction over a first and second platform of a table component, the first sheet of material being from a first roll of material positioned adjacent a first end of the table component 610 — positioning the first sheet of material so that a first portion of the first sheet of material overlies the first platform, a second portion of the first sheet of material overlies both a portion of a second sheet of material and the second platform 612 — sealing, at the second platform, the first sheet of material and the second sheet of material together to form a sealed edge such that the first sheet of material corresponds to a first gore of the balloon envelope and the second sheet of material corresponds to a second gore of the balloon envelope 614 — pulling a third sheet of material from a second roll of material positioned adjacent a second end opposite the first end of the table component onto the first and second platforms such that the third sheet of material overlies the first portion of the first sheet of material, and the third sheet being pulled in a second direction opposite the first direction 616 — sealing, at the first platform, the first sheet of material and the third sheet of material together to form a second sealed edge such that the second sheet of material corresponds to a second gore of the balloon envelope

AUTOMATED BALLOON ASSEMBLY MACHINE

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a number of components, such as a flexible envelope made of material that may be configured in sections or lobes to create a "pumpkin" or lobed balloon, and a plurality of tendons to support the lobes.

Typically, these components of the balloon envelope are assembled before the balloon can take flight. When this assembly technique is performed manually, the efforts can become extremely time-consuming and lack consistency.

BRIEF SUMMARY

According to aspects of the disclosure, a system for manufacturing a balloon includes a table component and a sealing component. The table component can include a first level and a second lower level. The first level can include first and second platforms. The first platform may provide a work area for sealing respective first and second sheets of material together to form a sealed edge. The second platform may provide a work area for sealing the second sheet of material and a third sheet of material together. The first, second, and third sheets of material may respectively form first, second, and third gores of the balloon envelope. The sealing component may be configured to move along a length of the first platform and to apply a heat seal to bond the first sheet of material to the second sheet material and form a sealed edge.

Additionally, the system may further include fourth, fifth, and sixth sheets of material that form respective fourth, fifth, and sixth gores of the balloon envelope.

According to one example of this aspect, the first and second platforms of the first level may extend along a first plane and the second level may extend along a second plane that is parallel to the first plane. The second level may be disposed between the first and second platforms.

In another example of this aspect, the system may further include a first roll of material from which the first and second sheets of material are obtained. The first roll of material may be movable back and forth along a length of the table. In some examples, the system can further include a second roll of material from which the second sheet of material is obtained. The first and second rolls are disposed adjacent one another and are configured to be movable along a length of the table component. Additionally, the system may further include a gantry configured to support the first and second rolls of material and to move the first and second rolls of material back and forth across the length of the table component. The gantry can be configured to withdraw the first sheet of material from the first roll and to position the first sheet of material on the first platform and the second platform.

According to another embodiment of this aspect, the third platform may be movable relative to the first and second platforms. The third platform may move in a first direction away from the first and second platforms and in a second direction toward the first and second platforms.

In another embodiment of this aspect, the sealed edge may be positioned on the third platform, and the third platform may be configured to move in a direction away from the first and second platforms.

In still another embodiment of this aspect, the sealing component is further configured to move along a length of the second platform and to apply a heat seal to seal the second sheet of material to the third sheet of material. Additionally, a displacing airflow unit may be positioned adjacent a rear of the sealing device. The displacing airflow unit may be configured to provide a directed stream of air onto a surface of the second sheet of material so as to move the second sheet of material to the first level.

In still another embodiment, the sealing component is a first sealing component and the assembly further comprises a second sealing component, the second sealing component configured to move along length of the second platform and to seal the second sheet of material to the third sheet of material.

In still another example, the system further includes a first arm configured to grip the material of the first roll and to pull the material of the first roll toward the second roll, and a second arm configured to grip the material of the second roll and to pull the material of the second roll toward the first roll.

In still another example of this aspect, the gantry further comprises first and second arms, the first arm may be configured to pull the end of material of the first roll toward the second roll and the second arm may be configured to pull the end of material from the second roll toward the first roll.

According to another aspect of the disclosure, a method of forming a balloon envelope includes pulling a first sheet of material in a first direction over a first and second platform of a table component, wherein the first sheet of material is from a first roll of material positioned adjacent a first end of the table component; positioning the first sheet of material so that a first portion of the first sheet of material overlies the first platform and so that a second portion of the first sheet of material overlies both a portion of a second sheet of material and the second platform; sealing, at the second platform, the first sheet of material and the second sheet of material together to form a sealed edge such that the first sheet of material corresponds to a first gore of the balloon envelope and the second sheet of material corresponds to a second gore of the balloon envelope; pulling a third sheet of material from a second roll of material positioned adjacent a second end opposite the first end of the table component onto the first and second platforms such that the third sheet of material overlies the first portion of the first sheet of material, and the third sheet being pulled in a second direction opposite the first direction; and sealing, at the first platform, the first sheet of material and the third sheet of material together to form a second sealed edge such that the second sheet of material corresponds to a second gore of the balloon envelope.

According to another embodiment of this aspect, the method further includes performing the sealing and the pulling of the third sheet of material at the same time. Additionally, the sealing device may move in the second direction away from the first end of the table component and towards the second end of the table component. Additionally, the third sheet of material may be pulled behind the sealing device.

According to another embodiment of this aspect, the sealed edge may be moved to a second level of the table component prior to the pulling of the third sheet of material. Additionally, moving the sealed edge may include directing at least one stream of air towards a surface of the first sheet of material. The at least one stream of air may be a plurality of streams of air, and moving the sealed edge may further include directing another one of the plurality of streams of air to the surface of the second sheet of material.

BRIEF DESCRIPTION OF THE DRAWINGS

FIG. 12 is an example of a flow diagram in accordance with aspects of the present disclosure.

DETAILED DESCRIPTION

Figure 1:
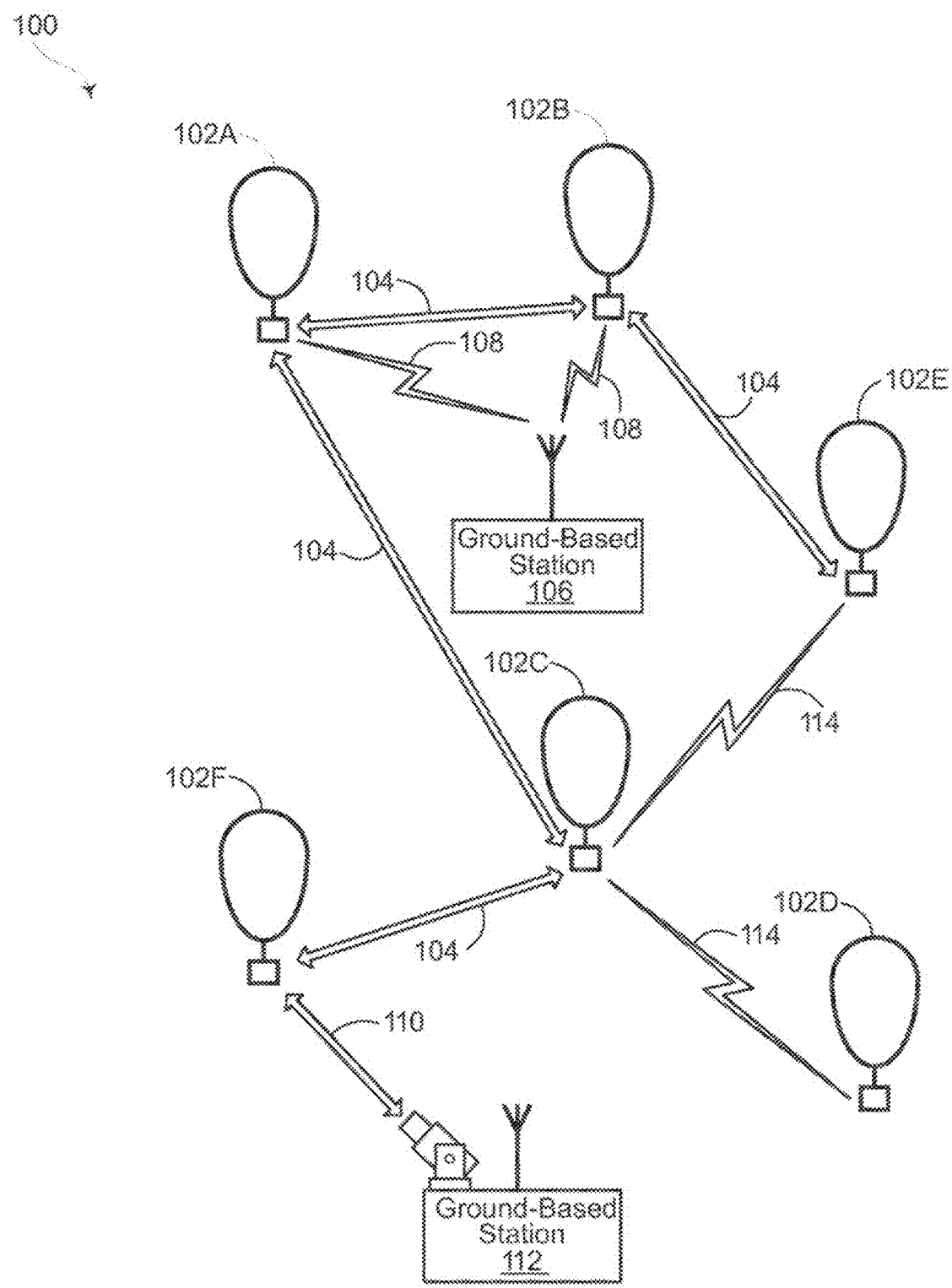
FIG. 1 is a functional diagram of a system in accordance with aspects of the present disclosure.

The present disclosure generally relates to providing a system for rapidly manufacturing balloon envelopes for use with high-altitude balloons for communication networks. In some situations, the communication networks may include hundreds of thousands of balloons that are deployed in the stratosphere at the same time. In this regard, aspects described herein provide a balloon gore sealing assembly may increase the overall efficiency in manufacturing balloons by using a repeatable and automated process. This may help minimize imprecision that can be caused by human error.

The balloon gore sealing assembly may include a table component that includes a first upper level and a second lower level. The first level of the table component may include two platforms that each provide working areas to heat seal balloon gores together. Securing airflow units may be positioned within each of the platforms to create a vacuum at the surface of the platforms and temporarily hold or secure the edges of one or more sheets of balloon envelope material in place during balloon assembly. The second lower level of the table component may include a third movable platform that can be positioned between the first and second platforms of the first level, and can be a trough used to support the assembled gores.

The sheets of balloon material may be stored on rolls coupled to the table or supported by an overhead gantry. In one example, first and second rolls of material are provided adjacent one another and configured to move from one end of the table component to another end. As the roll moves back and forth between the two ends of the table component, material from the roll can be withdrawn. Similarly, a second roll may be positioned adjacent the second end of the table and be configured so that the material from the roll can be withdrawn from the roll as the roll moves to the second end of the table. In another example, the rolls may be stationary or in a fixed position adjacent opposed ends of the table. The material may be pulled from the fixed roll towards the opposite end of the table.

A bonding device, such as a heat sealing device, may be provided that can travel along both the first and second platforms and bond two envelope gores together. Alternatively, two separate bonding devices may be utilized, each traveling along the length of one platform of the platforms. A displacing airflow unit may be attached at the rear of the bonding device in order to move one or more sheets of the material from either the first or second level of the first level to the second level. The bonding device may extend from an overhead gantry, along which the bonding device travels.

As an example, to create a balloon envelope, a first sheet of the material, which will form a first gore of the balloon envelope, can be placed onto the table as the gantry holding the roll of material is moved toward the opposite end of the table. The outermost lateral edges can be secured to the table, as material withdrawn from the roll as it moves toward the opposite end of the table. As the material forming the balloon envelope is withdrawn from the roll, the first sheet of material may be provided with a first tendon by pulling the tendon onto the top surface of the first sheet of material and securing the first tendon thereto.

Next, the securing airflow units may be activated on both the first and second platforms to create a vacuum to temporarily secure the material to the first and second platform and to pull the first sheet of material flat. In addition or alternatively, clamps can be used to hold the material in place. Once in position, the first sheet of material can be cut away from the roll, and a first side edge (along the length of the table) can be moved to the lower second level. The second side edge, opposite of the first side edge, remains overlying the second level held in position on the second platform by the securing airflow unit and/or clamps.

A second sheet of material, which will form a second gore of the balloon envelope, may be pulled out from the second roll as the gantry moves the second toll toward the first roll adjacent the first end of the table, positioned on the table component, secured in position by the securing airflow unit and/or clamps, and cut as with the first sheet of material. However, unlike the first sheet of material, both the first and second side edges of the second sheet of material remain overlying the first and second platforms.

As the second sheet of material is withdrawn from the second roll, a second tendon can be provided and secured to the second sheet of material. However, the second tendon will be applied to a bottom surface of the sheet of material, so that the first tendon and the second tendon will be attached to sides of the sheets of material that are oriented towards one another.

Portions of the first and second sheets of material that overlie one another at the second level, can be heat sealed together. The sealing device can move along the second level from the first end of the table toward the opposed second end. The sealing process may also involve cutting the sheets of material to form a sealed edge. This sealed edge may overlie the second level.

The sealed edge may be moved toward the second level, pulling portions of the first and second sheets of material towards the second level as well, while the first edge of the second sheet of material remains secured to the first platform by the airflow and clamps. The sealed edge may be moved, for example, by the weight of the sheet of material or using a directed stream of air. In one example, the displacing airflow unit positioned at the rear of the heat sealing device can provide a directed stream of air onto the top surface of the second sheet of material.

Additionally or alternatively, a second force can be applied to the top surface of the first sheet of material. For example, a second displacing airflow unit air positioned adjacent the side edge of the first platform can direct a stream of air onto the top surface of the first sheet of material. This force alone or combined with the first force of the air stream directed to the second sheet of material can move the sealed first and second sheets of material, to fall to the second level.

Once the first and second sheets of material are sealed and moved, a third sheet of material, which will form a third gore of the balloon envelope, can easily be pulled from the first roll by the first arm, positioned, secured, cut, provided with a tendon, and sealed with the second sheet of material at the first platform 412. In this regard, each successive gore can be pulled from the opposite roll and by the opposite arm from which the prior sheet of material was pulled, and the heat sealing can take place on the opposite platform in which the prior sheets were heat sealed. This cuts down on the setup time between the heat sealing.

The sealed edge is then moved to the second level such that the sealed sheets are neatly stacked during the manufacturing process. In that regard, additional sheets may be pulled from the rolls positioned, secured, cut, provided with a tendon, sealed with the previously pulled sheet of material, and the sealed edge moved to the second level as described above until a desired number of sheets, corresponding to the number of gores of a completed balloon envelope, have been sealed to one another.

Additionally, prior to the sealing as each tendon is attached to the respective sheet of material, the surface onto which the tendon is attached can be opposite the surface the tendon was attached on the previous sheet of material. This will ensure that the tendons will be located on the same surface of the balloon envelope (for instance, all internal, or all external).

To reduce the time required to assemble the balloon, the step of sealing two sheets of material and pulling the next sheet of material can be simultaneously performed. This can be accomplished by the heat sealing device moving in the same direction as the arm which pulls the sheet of material from the respective roll of material (and vice versa). For example, the heat sealing device can seal and cut the second and third sheets of material together starting at the second end of the table component and moving toward the first end of the table component along the first platform. As the heat sealing device moves down the length of the first platform, the second arm can follow behind the sealing device and pull out a fourth sheet of material from the second roll and also move in a direction toward the first roll. As with the example above, a stream of air from the displacing airflow unit can move the sealed edge of the second and third sheets from the first platform of the first level to the second level just prior to the second arm pulling the fourth sheet of material over the first and second platforms. The free edge of the third sheet can remain secured to the second level so that it can be sealed to a fourth sheet of material As the fourth sheet of material is drawn out, it can easily be pulled from the second roll, positioned, secured, cut, provided with a tendon, and sealed with the third sheet of material along the first platform. The third and fourth sheets of material can be sealed together on the second level, while the next sheet of material (e.g., the fifth sheet) is pulled from the first roll of material by the first arm. Again, this may continue until the desired number of gores has been created.

As noted above, the features described above can be used to fully or almost automate assembly of balloon envelopes. In addition, pulling the gores from two different rolls and in two different directions onto the table can help to cut down on the overall balloon assembly time. Moreover, simultaneously heat sealing and pulling the next sheet of material can cut the assembly time in half. The balloon assembly can help to create consistency among the balloon gores.

Example Balloon System

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the balloon network 100 includes a plurality of devices, such as balloons 102A-F, ground base stations 106,112 and links 104, 108, 110 and 114 that are used to facilitate intra-balloon communications as well as communications between the base stations and the balloons 102A-F. One example of a balloon is discussed in greater detail below with reference to FIG. 2.

Example Balloon

Figure 2:
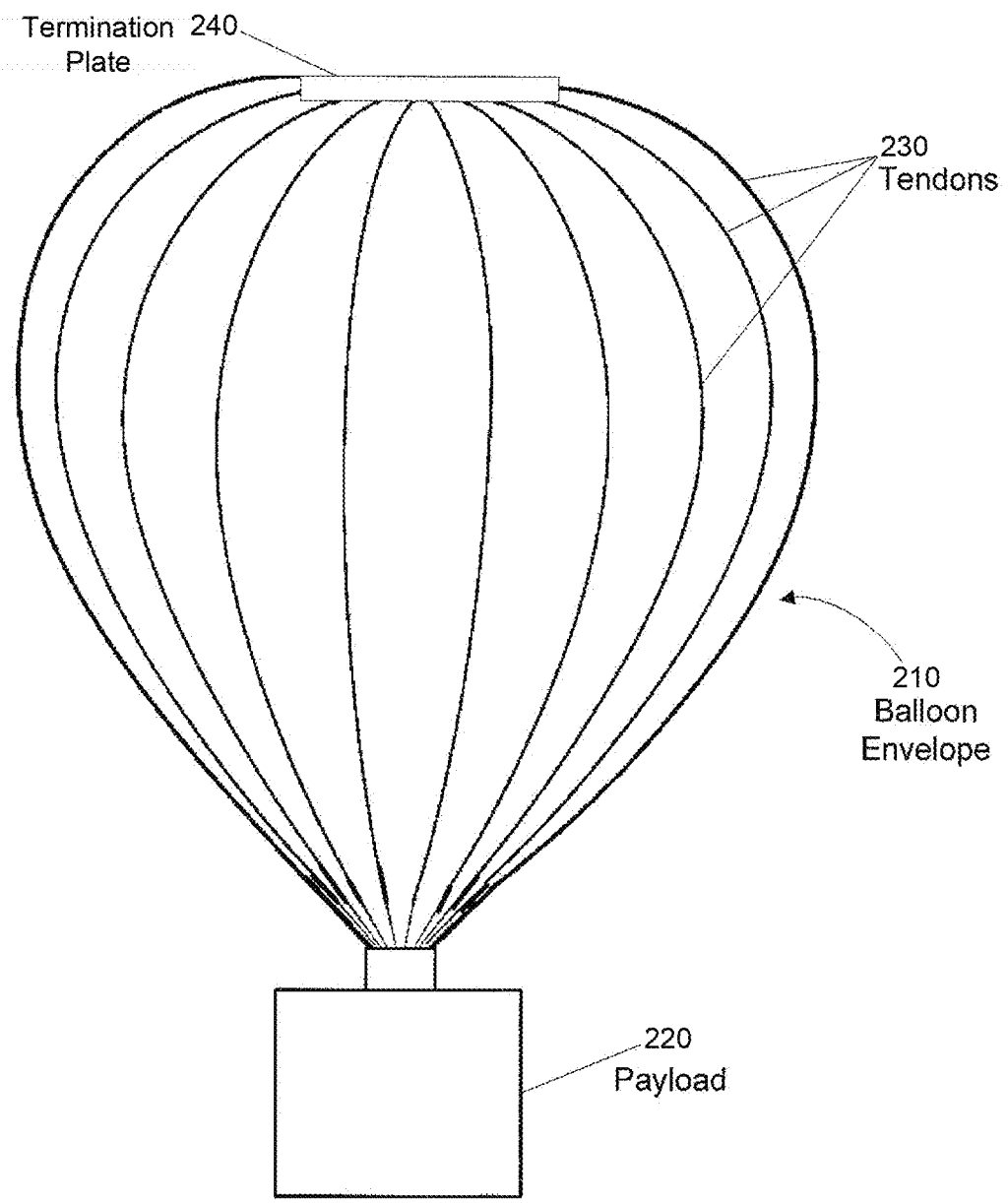
FIG. 2 is an example of a balloon in accordance with aspects of the present disclosure.

FIG. 2 is an example balloon 200, which may represent any of the balloons of balloon network 100. As shown, the balloon 200 includes a balloon envelope 210, a payload 220 and a plurality of tendons 230 attached to the balloon envelope 210 and a termination plate 240.

The balloon envelope 210 may take various forms. In one instance, the balloon envelope 210 may be constructed from materials such as polyethylene that do not hold much load while the balloon 200 is floating in the air during flight. Additionally, or alternatively, some or all of balloon envelope 210 may be constructed from a highly flexible latex material or rubber material such as chloroprene. Other materials or combinations thereof may also be employed. Further, the shape and size of the balloon envelope 210 may vary depending upon the particular implementation. Additionally, the balloon envelope 210 may be filled with various gases or mixtures thereof, such as helium, hydrogen or any other lighter-than-air gas. The balloon envelope 210 is thus arranged to have an associated upward buoyancy force during deployment of the payload 220.

The payload 220 of balloon 200 is affixed to the envelope by a connection such as a cable (not shown). The payload 220 may include a computer system (not shown), having one or more processors and on-board data storage. The payload 220 may also include various other types of equipment and systems (not shown). For example, the payload 220 may include an optical communication system, a navigation system, a positioning system, a lighting system, an altitude control system and a power supply to supply power to various components of balloon 200.

Pressurized lift gas within the balloon envelope 210 may cause a force or load to be applied to the example balloon 200. In that regard, the tendons 230 provide strength to the example balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Each tendon may be formed as a fiber load tape that is adhered to a respective envelope gore. Alternately, a type of sleeve or tubing may be adhered to the respective envelopes with the tendon 230 positioned therein. In some examples, the tendons 230 may be run from the apex to the bottom of the balloon envelope 210 in order to pick up the load. In normal operations, these tendons 230 need to be kept in place during balloon flight in order to continue to handle the load and maintain the shape of the balloon envelope.

Top ends of the tendons 230 may be coupled together using a type of apparatus, such as termination plate 240, which may be positioned at the apex of balloon envelope 210. In some examples, bottom ends of the tendons 230 may also be connected to one another. For example, a corresponding plate (not shown) may be disposed at a base or bottom of the balloon envelope 210. In some examples, the termination plate 240 at the apex may be the same size and shape as the plate at the bottom of the envelope 210. Both plates may include corresponding components for attaching the tendons 230 thereto.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of a plurality of envelope gores.

Figure 3:
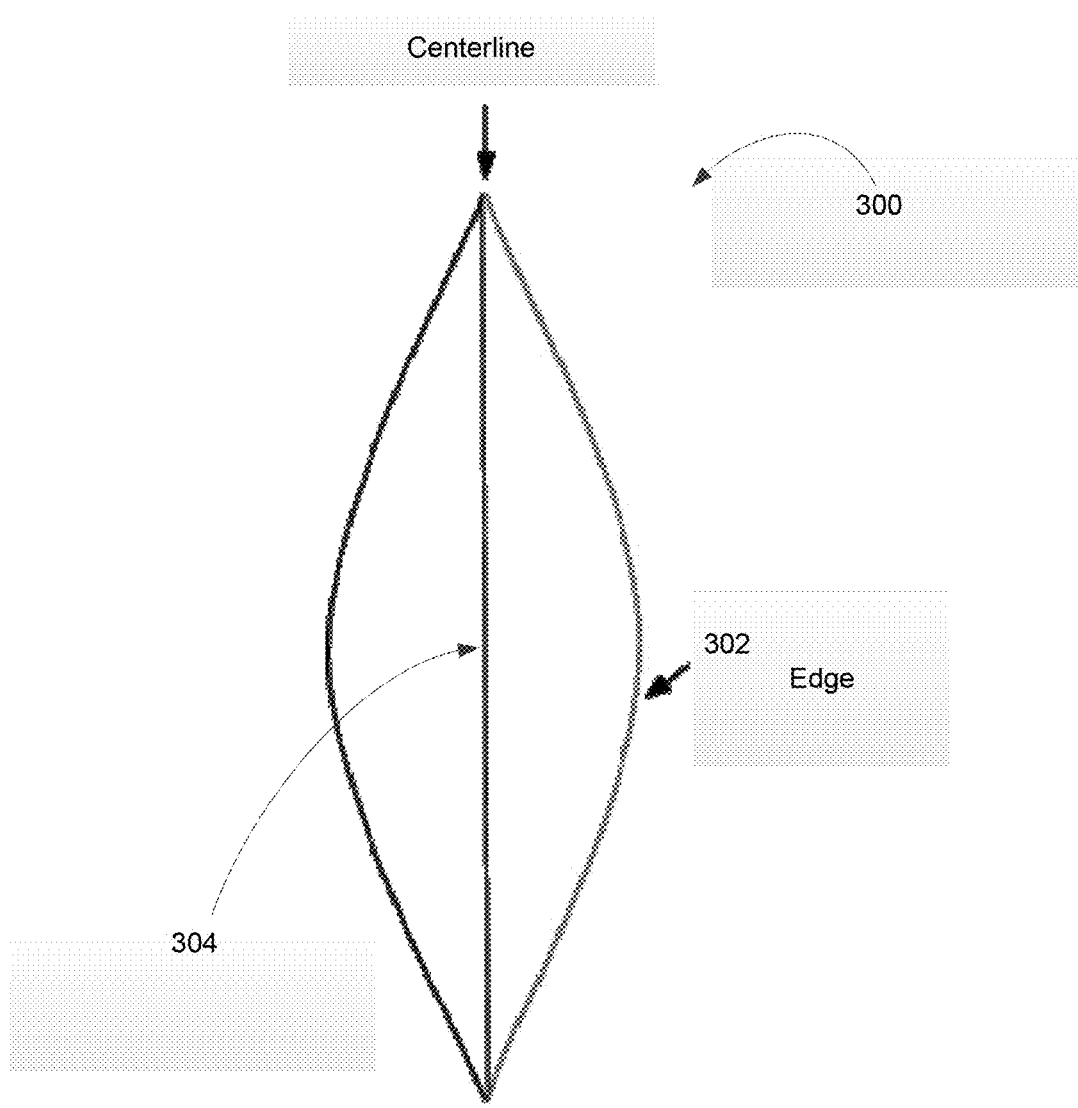
FIG. 3 is an example of an envelope gore in accordance with aspects of the present disclosure.

In FIG. 3, an example of an envelope gore 300 is shown. As shown, the envelope gore 300 may be shaped so that a length of edge seam 302 for connecting adjacent gores of the balloon envelope 210 is greater than a centerline of the envelope gore 300. When the balloon envelope 210 is inflated with lift gas, there may be an excess of envelope gore material that may bulge out somewhat before there is any strain on the envelope material. Because of this, a load may be applied to the shortest section of the envelope gore 300, e.g., the centerline portion of the envelope gore 300.

To help withstand the load caused by the lift gas within the envelope, a tendon 304 may be attached to the centerline of each gore of the envelope. As shown, the tendon 304 may be positioned lengthwise along the centerline. In some embodiments, the tendons may run through tendon tubing. The tendon tubing may be a lightweight clear plastic sleeve of a predetermined thickness, (e.g., 1 mil of polyethylene). Although the tendon 304 can move within the tendon tubing, the tubing can limit this movement so that the tendon 304 stays proximate to the centerline of the envelope gore 300.

In order to adhere the tendon 304 to the envelope gore 300, several techniques may be employed. In one example, tendon tubing comprising the tendon 304 may include a pressure sensitive adhesive (PSA) backing. In this example, a covering for the PSA backing may be removed so that the tendon tubing can be taped along the entire length of the envelope gore 300. In other examples, a heat-sealing method can be used. For example, an automated sealing unit (not shown) can be run along the tendon tubing in order to apply heat of a certain temperature to heat seal the tendon tubing to the envelope gore 300. The tendon 304 may be adhered to the envelope gore 300 during a certain manufacturing process. An example of an assembly for use during this manufacturing process is further described below.

Example Assembly

One aspect of the present technology provides an automated assembly for manufacturing envelope gores for balloons. In this example, the assembly includes particular machinery components, such as a sealing device and a compact assembly table with multiple platforms that provide for consistent and accurate preparation of envelope gores.

Figure 4:
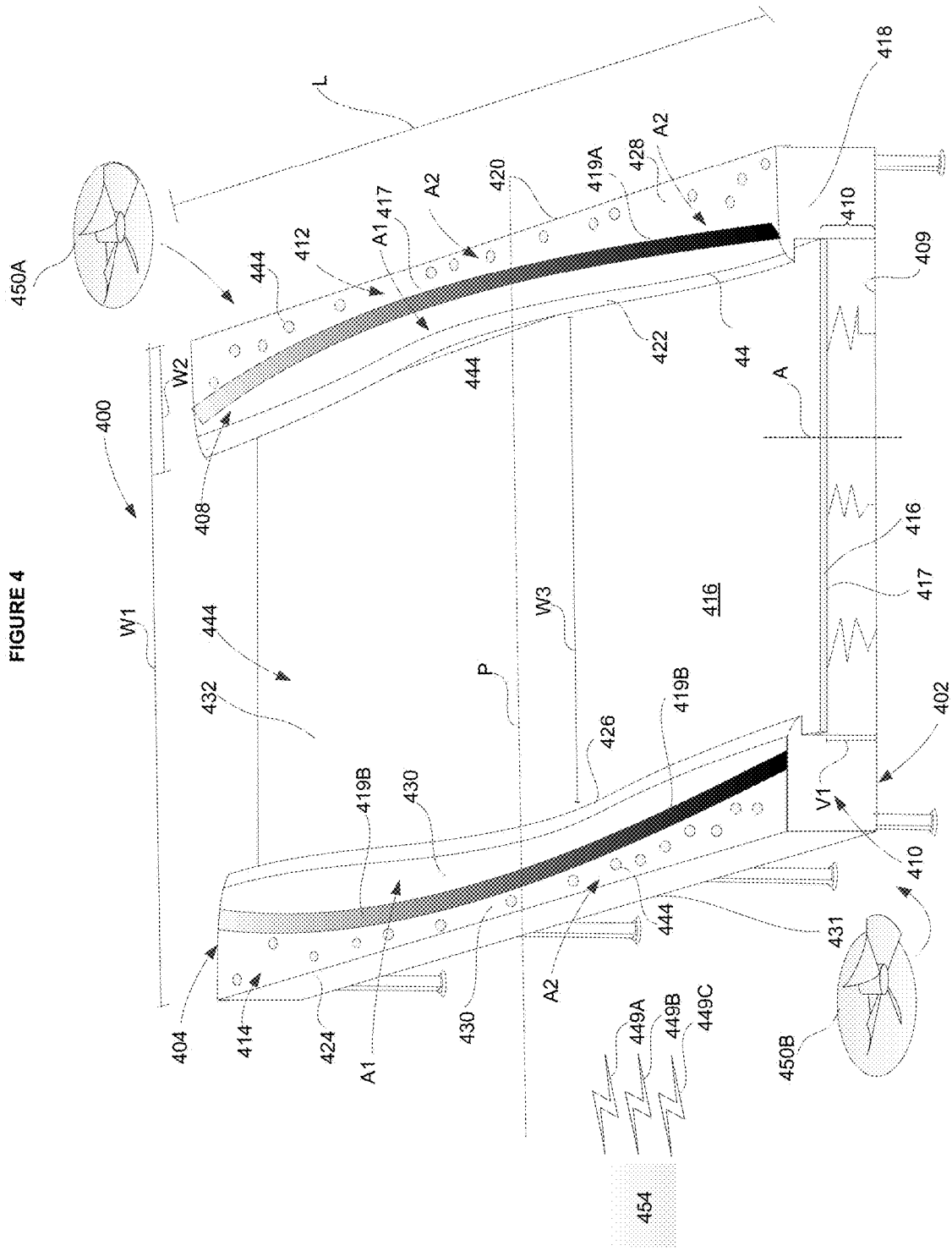
FIG. 4 is an example of a table component 400 in accordance with aspects of the present disclosure.

In FIG. 4, one example of a table component 400 for the assembly is shown. The table component 400 can be an elongated table with a length L extending between a first end 402 of the table component 400 and a second end 404 of the table component 400. The length L may be greater than its width W1, as well as greater than the length of a balloon envelope gore. The width W1 may be at least as wide as a width of a balloon envelope gore, but may be larger than the width of the balloon envelope for ease of assembly. As shown, the table component 400 may include a first level 408 and a second level 410. The first level 408 may include a first platform 412 and a second platform 414. The second level 410 may further include a base 409 and a movable third platform 416. As discussed further below, the table component 400 can be used to shape and heat-seal together individual gores of the balloon envelope made from sheets of balloon material.

Figure 6:
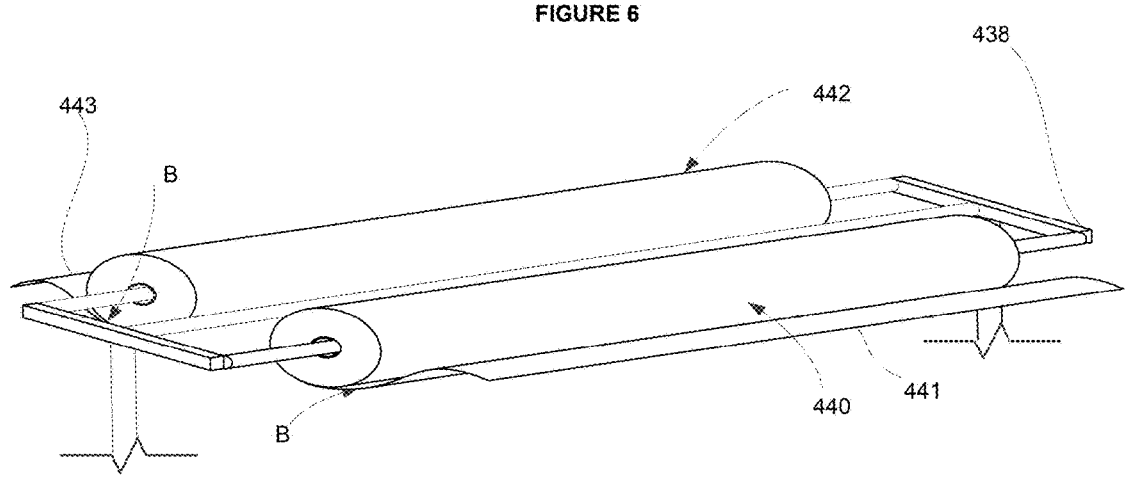
FIG. 6 is a perspective view showing a gantry supporting rolls of balloon material in accordance with aspects of the present disclosure.

The first platform 412 of the table component 400 may provide a first working area of the table component 400. An area A1 can be used to support the balloon envelope material withdrawn from a roll of balloon material during heat sealing and an area A2 can be used to secure balloon material to the first platform 412 during assembly. The width W2 of the first platform 412 can be selected that will at least provide an area for heat sealing sheets of balloon material withdrawn from one or more rolls of material 440, 442 (see FIGS. 6-7). The first platform 412 may include an outer edge 424 and an interior edge 422, as well as a top surface 428. The first platform 412 may be connected to the second level 410 by various means, such as a continuous wall 418 that extends between the bottom surface 431 of the edge of the first platform 412 of the first level 408 and the base 409 of the second level 410. Additionally or alternatively, a plurality of legs (not shown) may be used to join the first and second levels 408, 410 together. A smooth layer of compliant material (not shown), as well as heat resistant material where the heat seal occurs, such as a curve strip 419, may be provided on the top surface 428 of the first platform 412.

The curve strip 419A can be used to define the boundary for areas A1 and A2 on the first platform 412. Area A1 can be defined by the outer edge 417 of the curve strip 419A to the interior edge 426 of the table component, and the area A2 can be defined by the outer edge 420 of the table component 400 to the outer edge 417 of the curve strip 419A. The curve strip 419A may be in the shape of the curved edge of a gore. The interior edge surface 422 of the first platform 412 may have a curved surface that follows the contour of the curve strip 419A, but in other examples, the edge surface can take on any variety of shapes, such as planar, a continuous wave pattern, or any edge pattern. Similarly, the interior edge surface 426 may be sloped and extend in a direction toward the third platform 416, which can help with movement of the balloon material between the first and second levels 408, 410 during assembly. In other examples, the areas A1 and A2 may be combined or overlap, such that additional openings may be provided in the heat sealing area A1 to further assist with securing the balloon material to the first platform.

The second platform 414 of the table component 400 may be a mirror image of the first platform 412. The second platform 414 may include a second working area of the table component 400, which can be used to heat seal sheets of balloon material together. In this regard, second platform 414 can similarly include an area A1, which supports the balloon envelope material during heat sealing, and an area A2 where securing the balloon material occurs. As shown, the second platform 414 includes an outer edge 424 and an interior edge 426, as well as a top surface 430 and a bottom surface 431. Since heat sealing can also be performed on the second platform 414, the top surface 430 of the second platform 414 can be coated with a layer of a smooth compliant material (not shown), as well as heat resistant material where the heat seal occurs, such as a curve strip 419B, may be provided on the top surface. Finally, the edge surface 426 of the second platform 414 may be a curved surface that follows the contour of the curve strip 420. The edge surface 426 can also be sloped and extend in a direction toward the third platform 416.

In one instance, the top surface 428 of the first platform 412 and the top surface 430 of the second platform 414 may extend along the same plane P. Alternatively, the top surface 430 of the second platform 414 can extend in a horizontal plane that is vertically spaced apart from the top surface of the first platform 412 and vice versa. The second platform 414 may be laterally spaced apart from the first platform 412 to create an opening having a distance W3 (see also FIG. 4) that extends between the interior edge 422 of the first platform 412 and the interior edge 426 of the second platform 414. The third platform 416 of the second level 410 can be exposed through the opening 444 between the first and second platforms 412, 414.

The first and second platforms 412, 414 may overlie at least a portion of the third platform 416 of the second level 410. As shown, the interior edge 422 of the first platform 412 and the interior edge 426 of the second platform 414 overlie the top surface 432 of the third platform 416. However, in other examples, there is no overlap between the first and second platforms 412, 414 of the first level 408 and the third platform 416 of the second level 410. In such example, the interior edges 422, 426 of the first and second platforms 412, 414 will be aligned with the outermost edges of the third platform 416.

One or more airflow units may be provided within the first platform 412 and the second platform 414 to temporarily hold one or more sheets of balloon material in place during assembly. In one instance, as shown, for example in FIG. 4, a first air flow unit 450A may be positioned below the top surface of the first platform 412 and a second air flow unit 450B may be provided below the top surface 430 of the second platform 414. The first and second air flow units 450A, 450B may be configured with vents that can direct airflow to the respective top surfaces 428, 430 of the first and second platforms 412, 414. Openings 444 in the areas A2 of the first and second platforms 412, 414 allow for air to flow from the air flow units through the vents and into the openings 444 of the first and second platforms 412, 414, so as to create a vacuum that can secure the sheets of balloon material to the first and second platforms 412, 414. In one instance, all of the openings 444 will be positioned in the area A2 between the curve strip 419A and outer edge 420 of the first platform 412 and the area A2 between the curve strip 419B and outer edge 424 of the second platform 414. But, in other examples, openings 444 can additionally or alternatively be provided in the area A2. Dampers (not shown) can be provided that can either prevent or allow air flow from the first and second air flow units 450A, 450B into the respective first and second platforms 412, 414.

The second level 410 of the table component 400 may be configured for stacking up assembled gores of the balloon envelope 210. The second level 410 may include a base 409 and movable third platform 416, which forms a trough-like collection area for holding the gores during manufacture. A top surface 432 of the third platform 416 may be recessed below the top surface 428 of the first platform 412 and the top surface 430 of the second platform 414 so that the assembled envelope gores including the tendon attached to each gore portion can hold the gores during manufacture. Prior to balloon assembly, the third platform may be spaced away from the base 409 by a distance V1. Although, in other examples, the third platform can be positioned at any point between the base 409 of the second level and the first and second platforms 412, 414. In this example, V1 is positioned between the bottom surfaces of the first and second platforms 412, 414 of the first level and the base 409 of the second level.

Figure 5A:
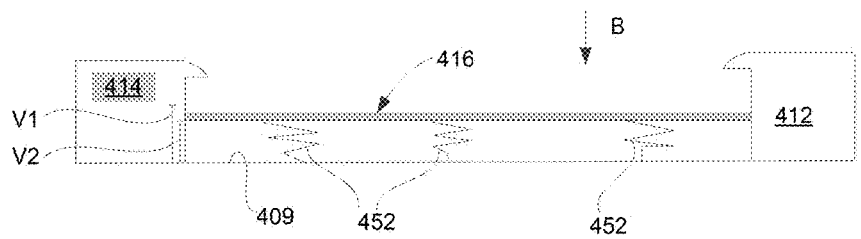
FIG. 5A is a cross-sectional view of a portion of FIG. 4.
Figure 5B:
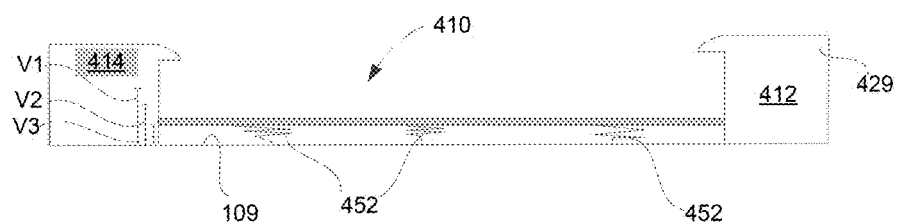
FIG. 5B is a cross-sectional view showing the third platform of FIG. 4 in another position according to aspects of the disclosure.

The third platform 416 of the second level 410 of the table component 400 may be movable between along an axis A that extends between the first and second platforms and the base 409 of the second level 410. For instance, as shown in FIG. 5A, the third platform 416 is shown moved in a direction B away from the first and second platforms 412, 414 and closer toward the base 409 of the second level 410. The distance V2 between the third platform 416 and base 409 of the second level is shown as being less than the distance V1. FIG. 5B show further movement of the third platform 416 toward the base 409 of the second level 410. The distance between the base 409 and the third platform 416 has been further reduced to a distance V3. In other examples, the third platform 416 can be configured to be moved so that it is directly adjacent the first and second platforms 412, 414 and forms a continuously planar surface across the first, second and third platforms 412, 414, and 416. The third platform can also move in the direction opposite to direction B, to place the third platform 416 in position to start a new balloon assembly and receive the gores of another balloon envelope.

The third platform 416 may be moved in a variety of ways. In this example, a plurality of collapsible arms 452 positioned at the bottom surface 417 of the third platform 416 can support, as well as permit movement of the third platform 416. A control unit 454 may be used to control movement of the third platform 416, including movement of the collapsible arms.

As shown in FIG. 4, the control unit 454 can be configured to move the third platform 416 progressively toward the base 409 of the second level 410 during balloon assembly, as well as return to a position closer to the first and second platforms 412, 414 once balloon assembly is completed. The control unit 454 can communicate with the third platform 416 using a communication link 449A, which can be a wired or wireless link. The third platform 416 may further include communication circuitry (not shown), such as a receiver/transmitter for processing signals to and from the control unit. In some examples, the signals generated by the control unit 454 may include commands for the third platform 416, for instance, to allow for movement of the third platform 416 toward the base 409 of the second level 410.

The control unit 454 may also be used to control when the air supply units are turned on and off and/or in what direction should air be flowing. For example, a communications link 449B can be used to establish a connection between the control unit 454 and each of the first and second air flow units 450A, 450B.

The sheets of balloon material may be stored on rolls supported by a gantry. As shown for example in FIG. 6, a first roll 440 of balloon material and a second roll 442 of balloon material may be positioned directly adjacent one another and secured to a gantry 438. The gantry 438 may be configured to hold the first and second rolls 440, 442 over the first and second platforms 412, 414, while traveling back and forth along the length L of the table component 400. In this example, the gantry 438 may extend along a track (not shown) positioned along the lower edges of the table component 400. In other examples, the gantry can be an overhead gantry (not shown) and the first and second rolls 440, 442 may be suspended from the top of the gantry.

The first roll 440 may be positioned on the gantry 438 so that the balloon material 441 can be pulled out from the bottom B of the first roll 440, as the first roll 440 is moved from the first end 402 of the table component 400 toward the second end 404 of the table component 400. The second roll 442 may be positioned so that the first balloon material 441 can also be pulled from the bottom B of the second roll 442, as the second roll 442 is moved from the second end 442 of the table component 400 toward the first end 402 of the table component 400. As shown, the first and second rolls 440, 442 may be secured to the gantry 438 in a fixed position relative to one another.

In other examples, the first roll 440 may be positioned at the first end 402 and the second roll 442 may be positioned at the second end 404. In such example, the first roll 440 may be configured to move in a direction toward the second end 404 of the table component 400 and return back to the first end 402 of the table component 400. The second roll 442, positioned at the second end 402 of the table component 400, can similarly travel from the second end 404 of the table component 400 and to the first end 402 of the table component 400 and return back to the second end 404.

In still another example, a single roll of material can be used to supply balloon material necessary to form the balloon gores. In such example, the material can be withdrawn from the bottom of the roll as the roll move from the first end towards the second end, whereas withdrawn from the top of the roll as the roll move towards the first end. Alternatively, the single roll can be reoriented as it moves back and forth between the first and second ends and inverted so that the material is always withdrawn from the bottom of the roll.

Figure 7:
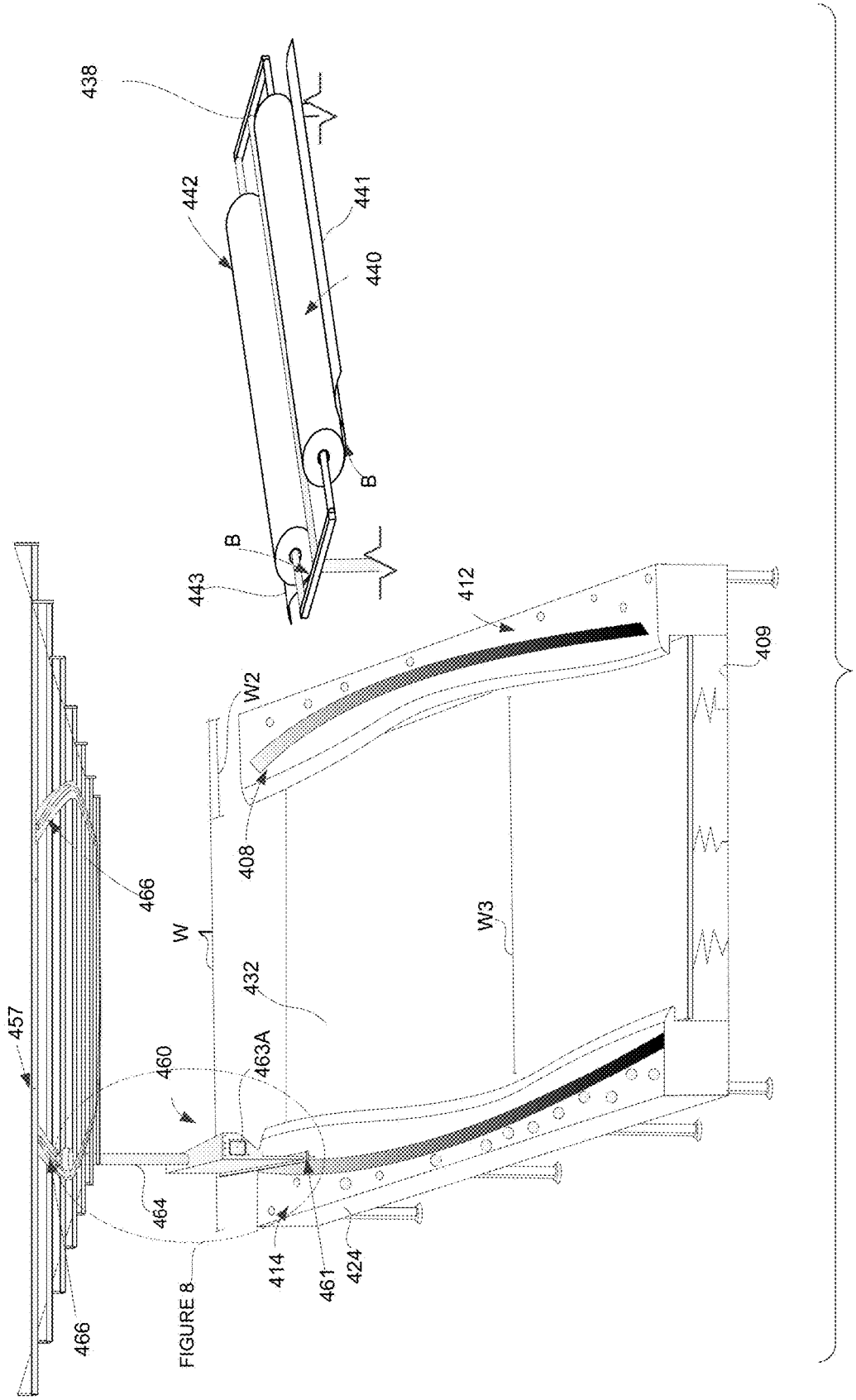
FIG. 7 is an example of a system in accordance with aspects of the present disclosure.
Figure 8:
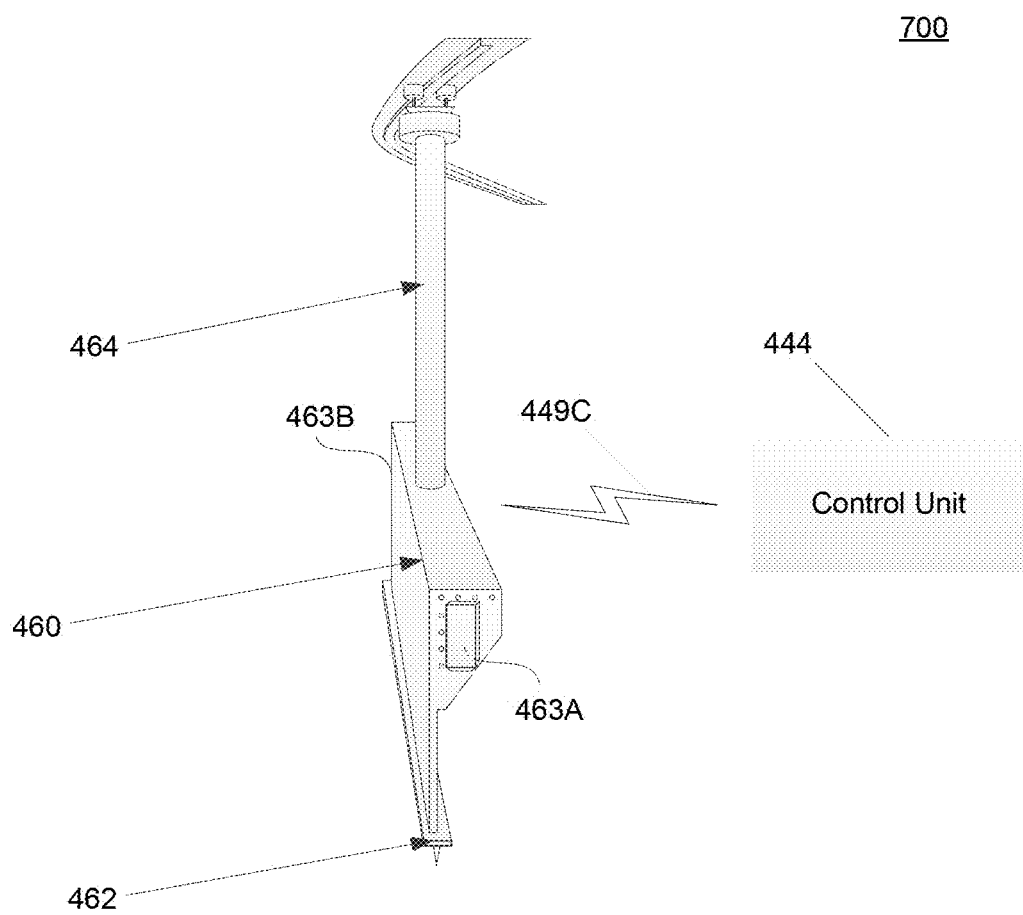
FIG. 8 is an enlarged portion of FIG. 7 showing an example of a sealing component in accordance with aspects of the present disclosure.

A bonding device, such as the heat sealing device 460 shown in FIG. 7 and the enlarged view of FIG. 8, may be provided that can travel back and forth along the length L of the table component 400, as well as along the length of the first and second platforms 412, 414, to bond two envelope gores together. Sealing device 460 may include an electrically heatable element 462 disposed on the device. The heatable element 462 may be of a predetermined width and length that may be used to unite layers of the balloon material. For example, the heatable element 462, when activated, for example by a flow of electricity, may reach a certain temperature that is hot enough to heat bond or otherwise melting a section of two or more sheets of balloon material together. In this regard, the sealing device 460 may be used to press the sheets together in order for the heat bond to activate. In some embodiments, heatable element 462 may have a generally planar surface so that the heat bond may be applied consistently across the section of balloon material currently being heat sealed. Although a heat activated adhesive or other types of similar adhesives may be used for heat sealing the balloon material, an advantage of melting the sheets together is that it results in a faster and easier process with minimal parts, and may produce a better Coefficient of Thermal Expansion (CTE) match across the heat sealed material. In other examples, a laser may be used to heat seal sheets of balloon material together. For example, instead of the heatable element 462, the sealing device 460 may house a laser configured to emit at least one laser beam onto the table component. The laser beam can be used to seal the edges of sheets of balloon material together.

In some embodiments, sealing device 460 may provide a combination of operations for heat sealing and cutting of the balloon material. For example, the sealing device 460 may be configured to cut the first and second balloon materials 441, 443 by using heat and an amount of pressure at the same time as the seal is made. Alternatively, the sealing device 460 may include blade like cutting members (not shown) attached to the heatable element 462. In some embodiments, the cutting members may be attached directly to the sealing device 460. In other embodiments, the cutting members may be separated from the sealing device 460 and used after the heat bonding is completed. Such cutting members can extend, for example, from the gantry and follow behind the sealing device. A benefit of configuring the sealing device 460 for cutting or providing separate cutting members that follow behind the sealing device 460 is that the balloon material may be immediately cut after being heat sealed or cut shortly thereafter. For example, as the sealing device 460 is pressed upon the balloon material, the device may be configured to automatically moved, thereby causing the cutting members to cut away portions of extra material.

In other embodiments, sealing device 460 may also provide the ability to displace cut balloon material. For example, displacing airflow units 463A, 463B (FIGS. 7-8) may be attached at both sides of the sealing device 460 and configured to direct a stream of air in a downward direction. As will be discussed in further detail below, such air stream can be directed to the top surface of a balloon material and provide an external force to help facilitate movement of one or more sheets of the material from the first level 412 to the second level 414. Alternatively, the displacing airflow units 463A, 463B can be separate units. For example, the displacing airflow units may extend from the overhead support 457 and be provided directly adjacent the sealing device 460, and travel with the sealing device 460. One benefit of configuring the sealing device 460 for displacing the cut balloon material is that it can almost immediately move the cut balloon material to the next level and allow for the table component to be in a condition to receive the next sheet of material. This can significantly cut down on the time required to prepare the table component for the next sheet of material and the overall time needed to assembly the balloon envelope.

In order to move the sealing device 460, a track may be used, which can be mounted on any suitable support. As shown in FIG. 7, a portion of the track 466 overlying the first and second platforms 412, 414 is shown mounted on an overhead support 457. The front portion of the track 466 showing joinder of the tracks overlying the first and second platforms 412 has not been included to provide for ease of view. In some embodiments, the track 466 may be configured so that the sealing device 460 can be guided along both a horizontal axis and vertical axis with respect to the overhead support 457. The horizontal axis may correspond to a lengthwise direction of a sheet of balloon material rolled out onto table component 400 and the vertical axis may correspond to a widthwise direction of the same sheet of balloon material. The track 466 can be configured so that sealing device 460 can be moved in a direction along the horizontal axis along both the first and second platforms 412, 414, as well as in a direction along the vertical axis between the first and second platforms 412, 414. In this regard, the track 466 may be a continuous track to allow the heat sealing element to continually move along the length of one platforms, over to the next platform, and then along the length of the next platform. As will be discussed below, this can allow the heat sealing element to continually heat seal balloon gores together. This forward and back movement of the sealing device 460 along track 466 can be automatically operated, for example, by a communications link 449C which provides commands 443C from the control unit 444.

The sealing device 460 can be mounted to actuating arm 464. As noted above, the arm 464 may allow the sealing device 460 some freedom of movement horizontally along track 466. In some embodiments, the actuating arm 464 can also be activated to cause the sealing device 460 to move vertically. For example, the actuating arm 464 may include housing (not shown) that can extend and retract the arm between first and second positions. In some aspects, extension of the actuating arm 464 allows the sealing device 460 to be pressed against the balloon material in order to cause the heat bond activation. As with the movement along track 466, the actuating arm 464 can extend and/or retract manually, automatically or some combination thereof, for example, by using commands from communication unit 470.

Alternatively, instead of providing only one sealing device 460 and one track 466, more than one sealing device and track may be used. For example, the first track can be configured to allow a first bonding device to travel back and forth along the length of the first platform 412. Similarly, a second track can be configured to allow a second bonding device to travel back and forth along the length of the second platform 414. This alternative embodiment eliminates the need for a sealing device to travel in a vertical direction between the first and second platforms.

Figure 9N:
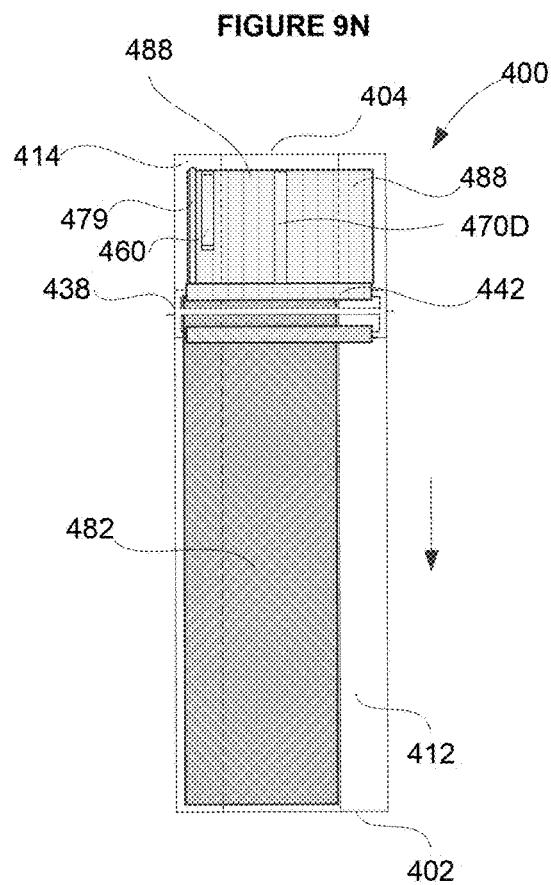
FIGS. 9A-9P is an example of a process for assembling envelope gores in accordance with aspects of the present disclosure.

One example method for assembling a balloon envelope is described with regard to FIGS. 9A-9N, of which FIGS. 9A, 9D, 9J, 9K, and 9N are schematic top plan views and FIGS. 9B-9C, 9E-9I, 9L-9M, and 9O-P are schematic cross-sectional views illustrating the method of assembly. To create a balloon envelope, a first sheet of material can be positioned onto the table component 400. As shown, for example, in FIG. 9A, the first sheet of material 441 can be pulled from the first roll 440 by the gantry 438 across the length L of the table component, including across both the first and second platforms 412, 414. The gantry 438 will travel from the first end 402 of the table component 400 to the second end 404 of the table component 400. As the gantry 438 travels toward the second end 404 of the table component 400, a first sheet of balloon material 441 is withdrawn from the first roll 440 and positioned onto the top surfaces 428, 430 first and second platforms 412, 414, as shown in FIG. 9B. The securing airflow units 450A, 450B within the respective first and second platforms 412, 414 may be activated to create airflow AF, as shown in FIG. 9B. While the first sheet of material 441 is being withdrawn from the first roll 440, the airflow AF can create a vacuum to temporarily secure the withdrawn sheet of material 440 to the top surfaces 428, 430 of the respective first and second platforms 412, 414. The vacuum can also help pull the sheet of material 441 flat.

Once the desired length of the material is pulled out from the first roll 440, the gantry is positioned at the second end 404 of the table component and the first sheet of material 441 can be cut away from the first roll 440 at the second end 404 of the table component 400 to form the first balloon gore 490. When cut, as shown, for example in FIG. 9C, the first sheet of material 441 will have a first edge 468 adjacent the first end 402 of the table component 400 and a second edge 448 adjacent the second end 404 of the table component 400. An elongated first side edge 447 and an elongated second side edge 448 of the sheet of material 441 both extend between the first and second side edges 447, 448 of the first sheet of material 441. The desired length $L_G$ and width $W_G$ of the first sheet of material 441 forming the first balloon gore can be at least equal to the length and width of the size of a balloon gore, but will typically have dimensions slightly greater than the length and width of a gore for greater ease during assembly. The length $L_G$ of the first and second side edges 447, 448 can be supported by the first and second platforms 412, 414 of the first level 408, however, portions of the first sheet of material 441 that extend between the interior edges 422, 426 of the respective first and second platforms 412, 414 will be unsupported and overlie the third platform 416 of the second level 410. Clamps (not shown) can additionally or alternatively be provided along one or both of the side edges of the first sheet of material 441 to further secure the withdrawn first sheet of material 441 in place.

A tendon may be secured to the first sheet of material 441 as the first sheet of material 441 is withdrawn from the roll. For instance, as shown in FIG. 9A, a tendon 470A may be pulled onto the top surface 445 of the first sheet of material 441 at the same time the first sheet of material 441 is pulled onto the table component 400. As the tendon 470A is withdrawn onto the first sheet of material 441, the tendon 470A can also be secured to the first sheet of material 441 using, for instance, an adhesive. Since the overall width of the balloon gore will be formed from the width $W_G$ of the sheet of material 441, the tendon 470A may be provided at a point P (see FIG. 9B), which is approximately halfway between the first edge and the second edge of the first sheet of material 441.

In some examples, to further support the weight of the tendon 470A, the tendon 470A can be pulled into tension. A first arm (not shown) may clamp onto the first end 469 of the tendon 470A adjacent the respective first end 402 of the table component and a second arm (not shown) may clamp onto the second end 471 of the tendon 470A adjacent the second end 404 of the table component 400. The first and second arms may each exert a pulling force on the respective first and second ends 469, 471 of the tendon 470A to place the tendon 470 in tension, which causes the tendon 470 to become taut. This may help to minimize sagging of the balloon material 441 on portions of the balloon material that are unsupported by the first and second platforms 412, 414.

Once the first sheet of material 441 is fully positioned on the first and second platforms 412, 414, airflow AF to the first platform 412 can be discontinued, as shown in FIG. 9D. Without the vacuum to secure the first side edge 447 to the top surface 428 of the first platform 412, the first side edge 447 (e.g., along the length of the table) will fall and be moved to the third platform 416 of the second level 410. The opposed second side edge 448 of the first sheet of material 441 can remain secured to the top surface 430 of the second platform 414 by the vacuum created by airflow AF from the airflow unit 450B, which remains activated. In some examples, the portion of the balloon material 441 overlying the first platform 412 can be trimmed to more easily allow the first side edge 447 to fall to the second level 410. Once the first side edge 447 of the first sheet of material 441 has been moved to the second level 410, the first sheet of material 441 will slope towards the second level 410.

A second sheet of material may be withdrawn to form a second gore envelope. In this example, as each gore is added to the balloon envelope assembly, the balloon assembly will alternate pulling sheets of material between the first and second rolls. For example, with the gantry 438 still positioned adjacent the second end 404 of the table, a second sheet of material can be pulled onto the table component 400. The second sheet of material 443, which will form a second gore of the balloon envelope, may be pulled from the second roll 442 as the gantry 438 is moved in a direction D2 toward the first end 402 of the table component 402, as shown, for example, in FIG. 9E. As the balloon material 443 is unrolled from the second roll 442 and moved toward the first end 402 of the table component 400, the second sheet of material 443 will overlap with the second edge 448 of the first sheet of material 441. The air units 450A, 450 B can be activated so that airflow AF can secure the second sheet of material 443 to the respective first and second platforms 412, 414. Once the gantry 438 has moved back to the first end 402 of the table component 400 and the second sheet of material 443 has been fully withdrawn from the second roll 442, the second sheet 443 can be cut.

As shown, for example, in FIG. 9F, the first side edge 476 and the second side edge 477 of the second sheet of material 443 overlies the first and second platforms 412, 414. The second side edge 477 of the second sheet of material 443 will overlie the second side edge 448 of the first sheet of material 441. The first side edge 476 of the second sheet of material 443 can directly overlie the top surface 428 of the first platform 412. The first and second securing airflow units 450A, 450B may be activated so that airflow AF can secure the second sheet of material 443 to both the first and second platforms 412, 414. A clamp 479 may also be provided on top of the second side edge 476 of the second sheet of material 443.

As the second sheet of material is withdrawn from the second roll and positioned onto the first and second platforms 412, 414, a second tendon 470B can be provided and secured to the second sheet of material 441. However, the second tendon 470B will be applied to a bottom surface 473 of the second sheet of material 443, so that the first tendon 470A and the second tendon 470B will be attached to sides of the first and second sheets of material 441, 443 that are oriented towards one another. Staggering the surfaces onto which the tendons 470A, 470B are applied ensures that the tendons will be located on the same surface of the balloon envelope (for instance, all internal, or all external).

Portions of the first and second sheets of material that overlie one another at the second level 414, can be heat sealed together. For example, as shown in FIG. 9G, the sealing device 460 can be used to heat seal the second side edge 448 of the first sheet of material 441 and the second side edge 477 of the second sheet of material 443 together. The sealing device 460 can move from the second end 404 of the table component 400 toward the first end of the table component along the second platform 414. Such movement can be in the same direction D2 (see FIG. 9E) that the gantry 438 travels to withdraw the second sheet of material 443 from the second roll 442. In other examples, the sealing device 460 can be positioned toward the first end 404 of the table component and move and heat seal in the opposite direction D1 (see FIG. 9A). When the sealing device 460 seals the first and second sheets of material 441, 443 together, excess material may be cut away to form a sealed edge SE1. As previously noted, the cutting of excess material can be accomplished by a separate cutting mechanism that follows behind the sealing device 460 or the cutting mechanism can be configured to be a part of the sealing device 460. This sealed edge SE1 can remain secured to the platform by the airflow AF.

The sealed edge SE1 may be moved toward the second level 410, as shown in FIG. 9H. Airflow AF from the first airflow unit 450A can remain activated and flow to the top surface of the first platform 412, while airflow AF from the second airflow unit 450B may be deactivated. Once the airflow AF from the second airflow unit 450B is discontinued, the weight of the first sealed edge SE1 causes the first sealed edge SE1 to fall to the third platform 416 of the second level 410. Airflow AF within the first platform 412, keeps the first edge 476 of the second sheet of material 443 secured to the first platform 412, so that the first edge 476 does not move to the third platform 416.

Secondary air flow can also be used to cause displacement of the sheets of material from the first and second platforms 412, 414 of the first level to the third platform 414 of the second level 410. In one instance, the displacing airflow unit 463A (FIGS. 7-8) positioned at an end of the heat sealing device 460 can be used to provide an additional external force in the form of a secondary airflow. As noted with regard to FIG. 8, the heat sealing device 460 includes two displacing airflow units 463A, 463B positioned at opposed sides of the heat sealing device 460. Depending on the direction the heat sealing device 460 travels, the displacing airflow unit positioned in the opposite direction in which the heat sealing device is traveling can be activated. In the example where the heat sealing device 460 is moving from the second end 404 of the table component 400 to the first end 402, the displacing airflow unit closest to the second end 404, for instance, displacing airflow unit 463B, can be activated. Once the heat sealing device 460 has heat sealed the first and second sheets of material together, directed air from the displacing airflow unit 463B can help to push the sealed edge SE1 off of the second platform 414 and onto the third platform 416.

Additionally or alternatively, with reference back to FIG. 9G, a secondary air flow from the displacing airflow unit 480B positioned on the intermediate portion of the second platform 414 can provide a directed force to the bottom surface 446 of the first sheet of material 441. Similarly, air flow from the displacing airflow unit 480A positioned on the intermediate portion of the first platform 412 can provide directed airflow onto the top surface of the sheet of material. Either or both of these secondary air flows can help to displace the sealed edge SE1 and cause movement of the sealed edge SE1 from the second platform to the third platform 416.

Once the first and second sheets of material 441, 443 are heat sealed together and the sealed edge SE1 moved to the third platform, the third platform 416 can be moved closer toward the base 409 of the second level 410. This can provide extra support for the completed envelope gores on the third platform and minimizes the excess pulling force created by completed envelope gores stored on the third platform. In one example, each time one or more sealed edges is moved to the third platform 416, the control unit 454 can transmit a signal to cause movement of the third platform 416 closer to the base 409 of the second level 410.

Successive sheets of material that form individual gores of the balloon envelope can continue to be pulled from the rolls of material. In this regard, each successive gore can be pulled from the opposite roll and in the opposite direction from which the prior sheet of material was pulled, and the heat sealing can take place on the opposite platform in which the prior sheets were heat sealed. This cuts down on the setup time between the heat sealing.

For example, once the first and second sheets of material 441, 443 have been pulled out from the respective first and second rolls 440, 442, the gantry 438 will again be positioned at the first end 402 of the table component. A third sheet of material 485, which will form a third gore of the balloon envelope, can be pulled from the first roll 440 as previously described herein and a tendon 470C attached to the third sheet 449. As shown, for example, in FIG. 9I, the third sheet of material 482 includes a top surface 483 and a bottom surface 484. A first side edge 485 of the third sheet of material 485 overlies both the first side edge 476 of the second sheet of material 443 and the first platform 412. The second side edge 486 of the third sheet of material 485 can directly overlie the second platform 414. A tendon 470C will also be pulled and secured to the third sheet of material 485 as the third sheet of material 485 is pulled out from the first roll 440. The first side edge 485 of the third sheet of material 485 will overlie the first side edge 475 of the second sheet of material 443. The second side edge 486 of the third sheet of material 485 will overlie the second platform 414. Airflow AF will secure the first and second side edges 485, 486 to the respective first and second platforms 412, 414. One or more clamps 479, as shown, for example, in FIG. 9J, can additionally or alternatively be provided on third sheet of material 443 overlying the first platform 412. The clamp 479 can help to further secure the second and third sheets 443, 485 in place during heat sealing. As shown in FIG. 9J, sealing device 460 can then be used to heat seal the second side edge 485 of the third sheet of material 482 and the second side edge 476 second and third sheets of material 443, 482 to form a second sealed edge SE2.

To reduce the time required to assemble the balloon, the step of sealing two sheets of material and pulling the next sheet of material can be simultaneously performed. This can be accomplished by the heat sealing device moving in the same direction and at the same time in which the gantry 438 pulls the sheet of material from the respective roll of material (and vice versa). For example, as shown in FIG. 9K, as the gantry 438 pulls the third sheet of material 482 from the first roll 440 onto the first and second platforms 412, 414, the heat sealing device 460 can follow directly behind the gantry 438 and first roll 440. As the gantry 438 moves in a direction toward the second end 404 of the table component 400, the heat sealing device 460 also moves in the same direction down the length of the first platform 412. The heat sealing device 460 can heat seal the second and third sheets of material together almost immediately after the third sheet of material 482 is placed on the first platform 412.

The airflow AF to the first platform 412 can be sequentially discontinued along the length of the first platform 412. Airflow AF can continue flowing to the first platform 412 where portions of the second and third sheets of material 443, 482 are not yet heat sealed together. Airflow AF can be discontinued to those portions of the first platform 412 where the second sealed edge SE2 has been created to allow for movement of the second sealed edge SE2 down to the third platform 416 of the second level 410. As illustrated in FIG. 9L, the displacing unit 463A closest to the first end 402 of the table component 400 can direct airflow to the second sealed edge SE2, such that the second sealed edge SE2 falls to the third platform 416, as also shown in FIG. 9M. In other examples, where the displacing unit is an independent unit separate from the sealing device 460, the displacing unit (not shown) can follow behind the sealing device 460 to direct airflow onto the sealed edge SE2 shortly after the sealed edge SE2 has been formed.

Figure 9O:
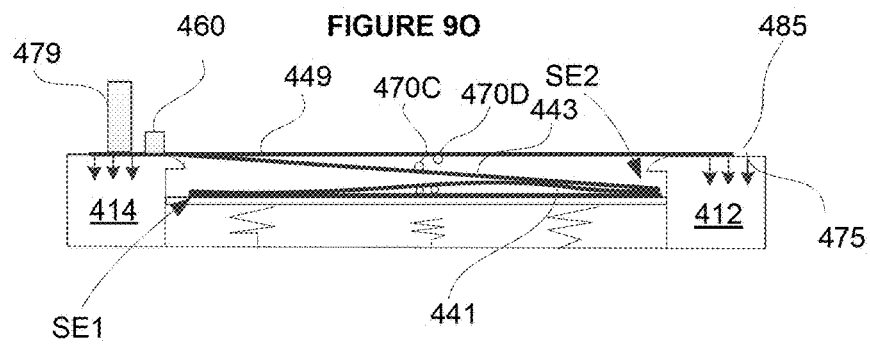
Figure 9P:
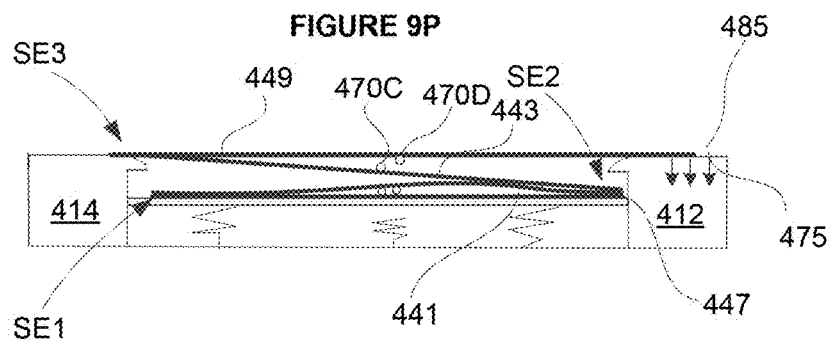

When the gantry reaches the second end 404 of the table component 400, the process can be repeated and a fourth sheet of material 488 can be provided onto the first and second platforms 412, 414. The continuous track 466 (see FIG. 8) along which the sealing device 460 can be configured so that the sealing device 460 can be moved past the gantry 438, as well as move from the first platform 412 over to the second platform 414 into a position behind the second roll of material, as shown, for example, in FIG. 9N. Once the sealing device 460 is in position, the gantry 438 can again move in a direction toward the first end 402 of the table component 400 while pulling the fourth sheet of material from the second roll 442 and also allowing for the tendon 470D to be applied to the fourth sheet of material 488. The sealing device 460 can also move in the same direction as the gantry 438, but this time along the length of the second platform 414, as also shown in FIG. 9O. The second edges of the third and fourth sheets of material 482, 488 can then be heat sealed together to form a third sealed edge SE3, as shown, for example in FIG. 9P, which illustrates the sealed edge SE3 prior to the sealed edge SE3 being moved to the second level 410. As with the example above, a stream of air from the displacing airflow unit 463B can help to move the sealed edge SE3 from the second platform 414 to the third platform 416. Airflow AF to the first platform 412 remains so that the free edge of the fourth sheet of material 488 can remain secured to the first platform 412 so that it is ready to be joined with a fifth sheet of material (not shown).

Additional sheets of material that will form an envelope gore can continue to be cut and heat sealed together in the same manner prescribed above. Once the desired number of gores is achieved, the first edge 476 of the first sheet of material 441 can be manually pulled out from under the stack of gores and joined together and heat sealed with the free edge of the last gore, which would remain secured to the platform the free edge overlies. The first edge 476 and free edge of the last gore can then be heat sealed together to form a completed balloon envelope.

Figure 10A:
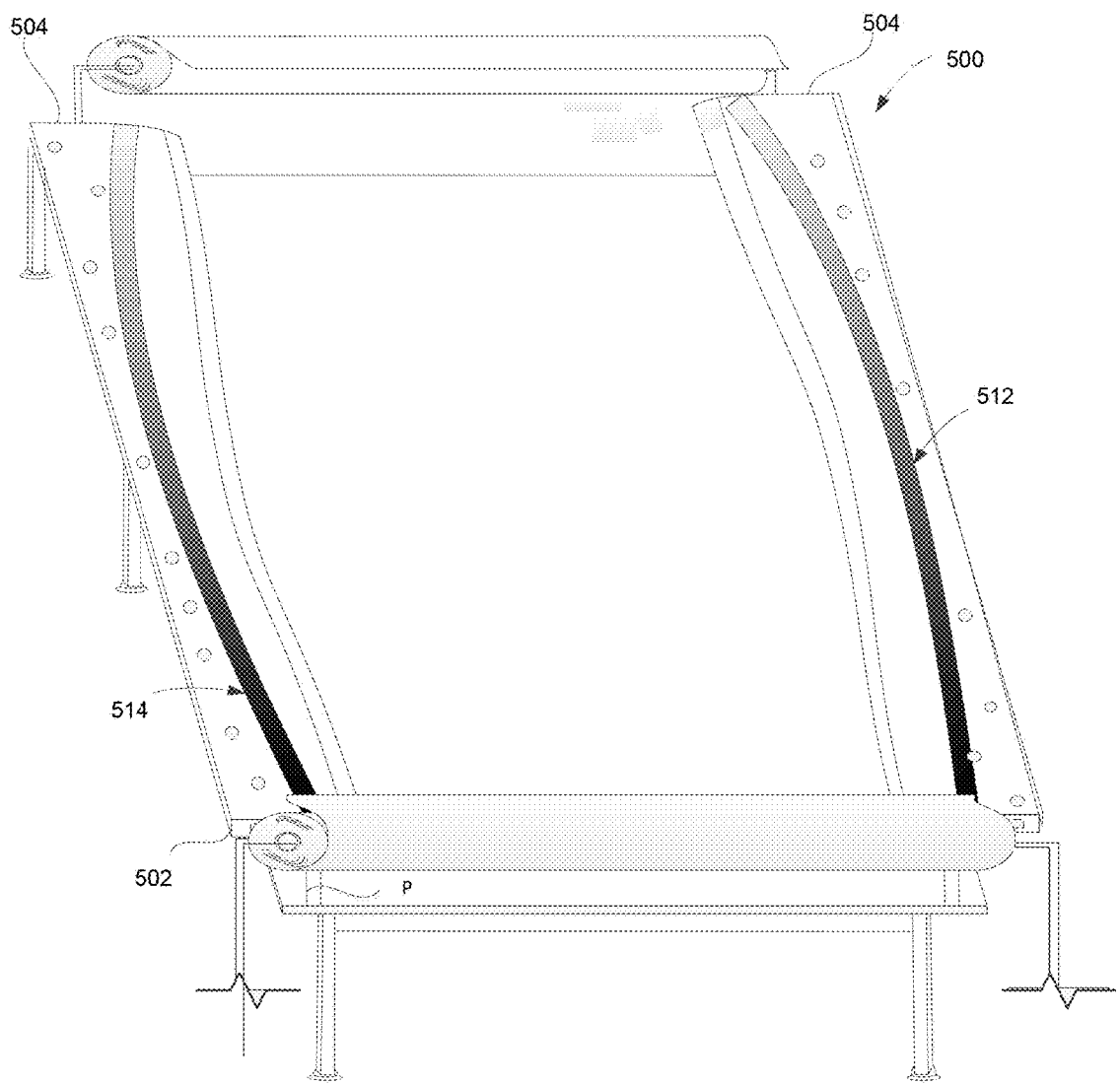
FIG. 10A is another example of a table component in accordance with aspects of the present disclosure.

Another example table component 500 is illustrated in FIG. 10A. Table component 500 includes features similar to table component 400. For example, table component 500 includes a first platform 512, a second platform 514, which are similar to the first platform 412 and second platform 414 of the previous embodiment. Table component 500 includes an intermediate third platform 516, which differs from the platform 416 of the previous example in that the third platform 516 is fixed. In this example, the first, second, and third platforms 516 are fixed relative to one another.

Figure 11:
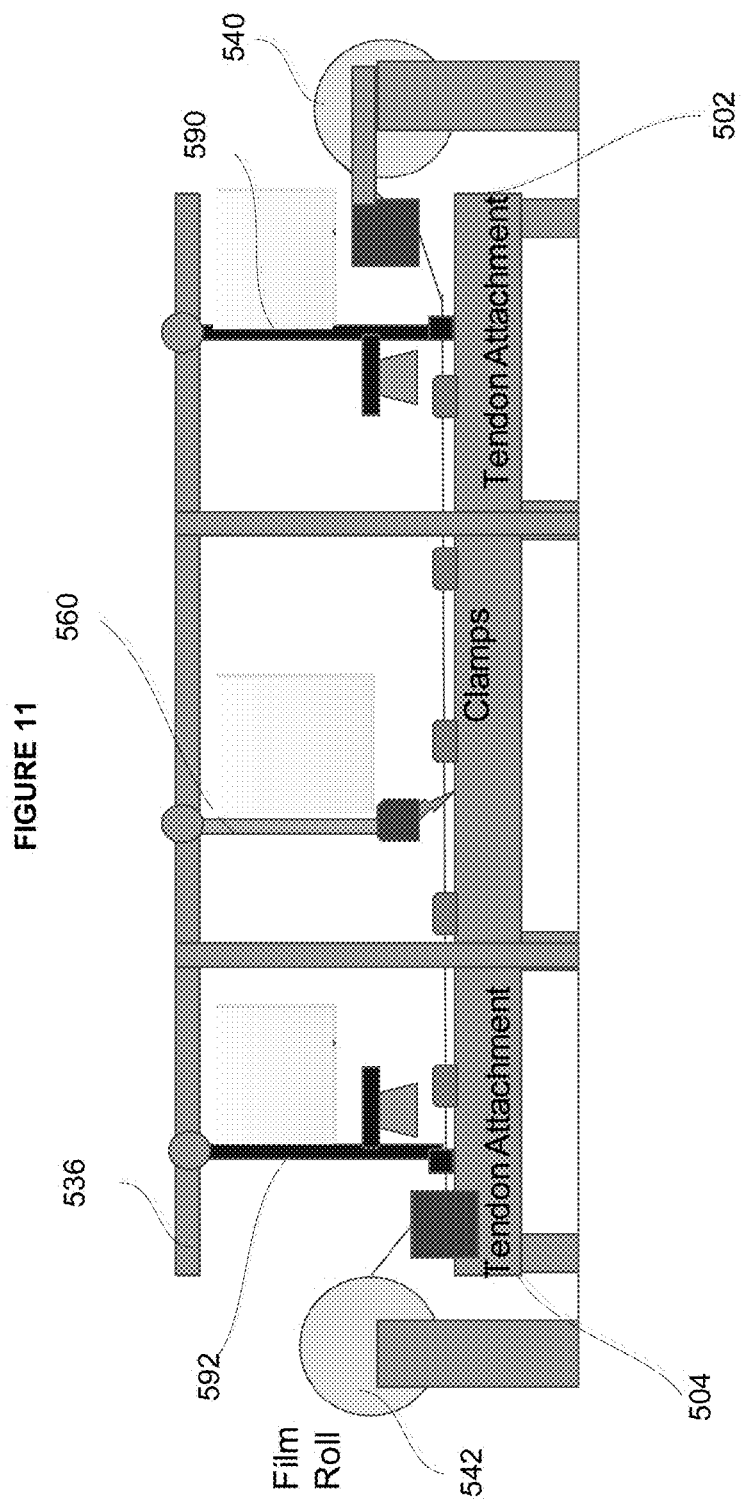
FIG. 11 is a schematic cross-sectional view of an example system in accordance with aspects of the present disclosure.

Instead of the rolls of material being provided on a movable gantry, the rolls of material may be in a fixed position at opposite ends of the table. In one instance, first roll 540 may be positioned adjacent the first end 502 of the table component 500 and second roll 542 may be positioned adjacent the second end 504 of the table component. To withdraw balloon material from the first and second rolls 540, 542, arm mechanisms may be used to pull the sheets of material across the first and second platforms. For example, as shown in FIG. 11, a first arm 590 may extend from an overhead gantry 536. The first arm 590 may include a holding mechanism to hold material withdrawn from the first roll 540 and pull the first sheet of material 541 across the first and second platforms (not shown in this view). Similarly, when it is time to withdraw the second sheet of material from the second roll of material 542 adjacent the second end 504 of the table component 500, a second arm 592 extending from the overhead gantry 536 can be used to position the second sheet of material 543 on the table component 500. The second arm 592 may pull the exposed end of the second sheet of material 543 across the first and second platforms 512, 514, and in a direction toward the first end 502. The cutting, clamping, and heat sealing using the heat sealing device 560 can otherwise be performed according to the same methods previously discussed.

Figure 10B:
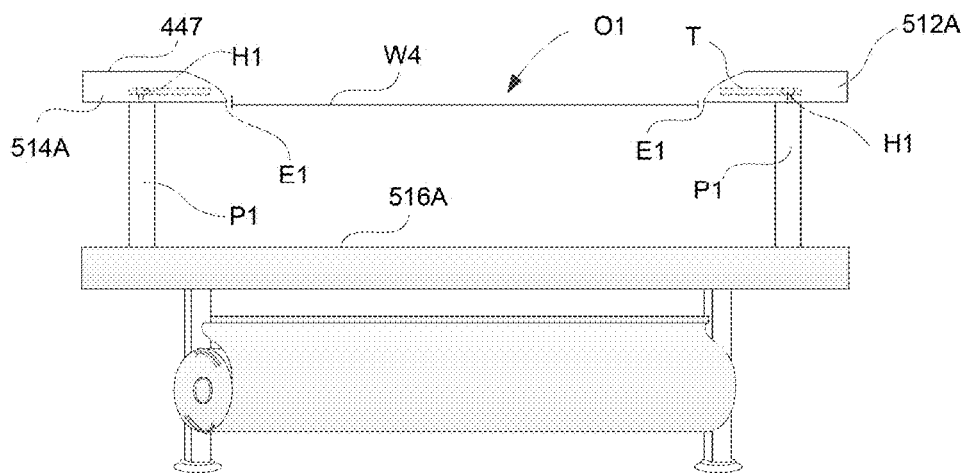
FIG. 10B is another example of a table component in accordance with aspects of the present disclosure.

In other examples, such as shown in FIG. 10B, one or both of the first and second platforms and may be movable relative to the third platform 516A. For instance, one or both of the first and second platforms 512A, 514A may be configured to move in a lateral direction. The first platform 512A may be configured to move in a lateral direction away from and toward the second platform 512B, and the second platform 514A may move in a lateral direction away from and toward the first platform 512A. In one example, posts P1 supporting the first and second platforms may include a post head H that can allow for the respective first and second platforms 512A, 512B to be moved along a track T within an interior portion of the first and second platforms 512A, 512B. This can allow the first and second platforms 512A, 512B can move relative to the track, as well as to each other and the third platform 516A. Movement of the first and second platforms 512A, 514A can increase the width W4 of the opening O1 between the respective interior edges E1 of the first and second platforms 512A, 512B. This can allow for balloon material to move from the first platform 512A and second platform 514A to the third platform 516A.

Figure 10C:
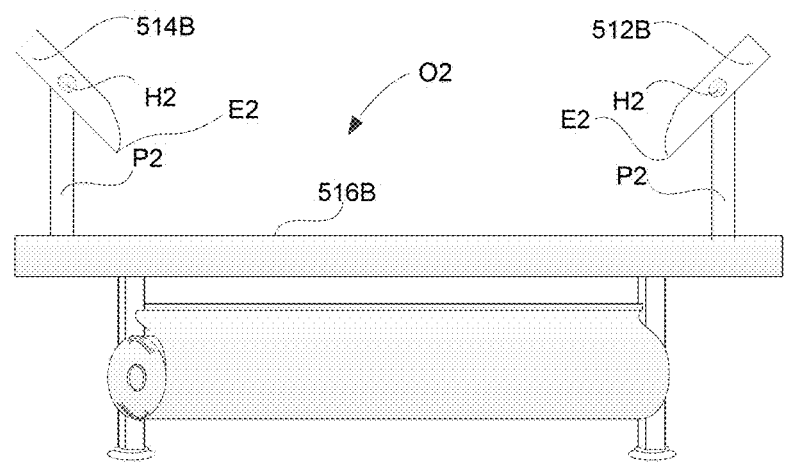
FIG. 10C is another example of a table component in accordance with aspects of the present disclosure.

In another example, as shown in FIG. 10C, one or both of the first and second platforms 512B, 514B can be configured to rotate toward and away from the third platform 516B. As shown, the first platform 512B can rotate about post head H2 into a downward direction toward the third level 516B. Similarly, the second platform 514B can rotate about the post head H2 and move into a downward direction toward the third platform 516B. Movement of the second level can increase the size of the opening O2 between the respective interior edges of the first and second platforms 512A, 514B. This can allow for balloon material to easily move from the first platform 512A and second platform 514A to the third platform 516A.

An example method 600 of forming a balloon envelope is disclosed with regard to FIG. 12. At block 608, a first sheet of material can be pulled in a first direction over a first and second platform of a table component. The first sheet of material can be from a first roll of material positioned adjacent a first end of the table component. At block 610, the first sheet of material may be positioned so that a first portion of the first sheet of material overlies the first platform, a second portion of the first sheet of material overlies both a portion of a second sheet of material and the second platform. At block 612, the first sheet of material and the second sheet of material may be sealed together at the second platform to form a sealed edge, such that the first sheet of material corresponds to a first gore of the balloon envelope and the second sheet of material corresponds to a second gore of the balloon envelope. At block 614, a third sheet of material may be pulled from a second roll of material positioned adjacent a second end opposite the first end of the table component. The third sheet of material may be pulled onto the first and second platforms, such that the third sheet of material overlies the first portion of the first sheet of material. The third sheet of material may be pulled in a second direction opposite the first direction. At block 616, the first sheet of material and the third sheet of material may be sealed together, at the first platform, to form a second sealed edge such that the second sheet of material corresponds to a second gore of the balloon envelope.

As noted above, the features described above can be used to fully or almost automate assembly of balloon envelopes. In addition, pulling the gores from two different rolls and in two different directions onto the table can help to cut down on the overall balloon assembly time. Moreover, simultaneously heat sealing and pulling the next sheet of material can cut the assembly time in half. The balloon assembly can help to create consistency among the balloon gores.

While certain processes in accordance with example implementations are shown in the figures as occurring in a linear fashion, this is not a requirement unless expressly stated herein. Different processes may be performed in a different order or concurrently.

The example embodiments described herein are not meant to be limiting. It will be readily understood that the aspects of the present disclosure, as generally described herein and illustrated in the figures, can be arranged, substituted, combined, separated, and designed in a wide variety of different configurations, all of which are explicitly contemplated herein.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same or similar reference numbers in different drawings can identify the same or similar elements.

The invention claimed is:

1. A system for manufacturing a balloon envelope, the system comprising:
    a table component that includes a first level and a second level lower than the first level, the first level further including first and second platforms, the first platform providing a work area for sealing respective first and second sheets of material together to form a sealed edge and the second platform providing a work area for sealing the second sheet of material and a third sheet of material together, the first, second, and third sheets of material respectively forming first, second, and third gores of the balloon envelope;
    a sealing component, the sealing component configured to move along a length of the first platform and to apply a heat seal to bond the first sheet of material to the second sheet material and form the sealed edge; and a third platform configured to move in a direction away from the first and second platforms.

2. The system of claim 1, wherein the first and second platforms of the first level extend along a first plane and the second level extends along a second plane parallel to the first plane, the second level being disposed between the first and second platforms.

3. The system of claim 1, wherein the system further comprises a first roll of material from which the first sheet of material is obtained, the first roll of material being movable back and forth along a length of the table component.

4. The system of claim 3, further comprising a second roll of material from which the second sheet of material is obtained, wherein the first and second rolls are disposed adjacent one another and are configured to be movable along a length of the table component.

5. The system of claim 3, further comprising a second roll of material from which the second sheet of material is obtained, wherein the first and second rolls are disposed at fixed positions at opposite ends of the table component.

6. The system of claim 4, further comprising a gantry configured to support the first and second rolls of material and to move the first and second rolls of material back and forth across the length of the table component, the gantry further configured to withdraw the first sheet of material from the first roll and to position the first sheet of material on the first platform and the second platform.

7. The system of claim 1, wherein the third platform is movable relative to the first and second platforms in a direction toward the first and second platforms.

8. The system of claim 1, wherein the sealing component is further configured to move along a length of the second platform and to apply a heat seal to seal the second sheet of material to the third sheet of material.

9. The system of claim 1, wherein the sealing component is a first sealing component and the system further comprises a second sealing component, the second sealing component configured to move along length of the second platform and to seal the second sheet of material to the third sheet of material.

10. The system of claim 1, further comprising a displacing airflow unit adjacent a rear of the sealing component, the displacing airflow unit configured to provide a directed stream of air onto a surface of the second sheet of material so as to move the second sheet of material to the first level.

11. The system of claim 1, further comprising fourth, fifth, and sixth sheets of material forming respective fourth, fifth, and sixth gores of the balloon envelope.

12. The system of claim 5, wherein the system further comprises a first arm configured to grip the material of the first roll and to pull the material of the first roll toward the second roll, and a second arm configured to grip the material of the second roll and to pull the material of the second roll toward the first roll.

13. The system of claim 5, further comprising a gantry configured to support the first and second rolls of material and to move the first and second rolls of material back and forth across the length of the table component, wherein the gantry further comprises first and second arms, the first arm configured to pull an end of material of the first roll toward the second roll and the second arm configured to pull an end of material from the second roll toward the first roll.

14. A method of forming a balloon envelope comprising:
pulling a first sheet of material in a first direction over a first and second platform of a table component, the table component including a first level that includes the first and second platforms, and a second level lower than the first level that includes a third platform configured to move in a direction away from the first and second platforms, the first sheet of material being from a first roll of material positioned adjacent a first end of the table component;
positioning the first sheet of material so that a first portion of the first sheet of material overlies the first platform, a second portion of the first sheet of material overlies both a portion of a second sheet of material and the second platform;
sealing, at the second platform, using a sealing component configured to move along a length of the first platform and apply a heat seal to bond the first sheet of material and the second sheet of material together to form a sealed edge such that the first sheet of material corresponds to a first gore of the balloon envelope and the second sheet of material corresponds to a second gore of the balloon envelope;
pulling a third sheet of material from a second roll of material positioned adjacent a second end opposite the first end of the table component onto the first and second platforms such that the third sheet of material overlies the first portion of the first sheet of material, and the third sheet being pulled in a second direction opposite the first direction; and
sealing, at the first platform using the sealing component, the first sheet of material and the third sheet of material together to form a second sealed edge such that the second sheet of material corresponds to a second gore of the balloon envelope.

15. The method of claim 14, further comprising performing the sealing and the pulling of the third sheet of material at the same time.

16. The method of claim 15, further comprising moving the sealing component in the second direction away from the first end of the table component and towards the second end of the table component.

17. The method of claim 16, further comprising pulling the third sheet of material behind the sealing component.

18. The method of claim 14, wherein the sealed edge is moved to the second level of the table component prior to the pulling of the third sheet of material.

19. The method of claim 18, wherein moving the sealed edge comprises directing at least one stream of air towards a surface of the first sheet of material.

20. The method of claim 19, wherein the at least one stream of air is a plurality of streams of air, and wherein moving the sealed edge further comprises directing another one of the plurality of streams of air to the surface of the second sheet of material.

* * * * *